(12) United States Patent
Nakajima

(10) Patent No.: US 9,066,029 B2
(45) Date of Patent: Jun. 23, 2015

(54) SOLID-STATE IMAGE PICKUP DEVICE, IMAGE PICKUP DEVICE, AND SIGNAL READING METHOD

(71) Applicant: OLYMPUS CORPORATION, Tokyo (JP)

(72) Inventor: Shinichi Nakajima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 67 days.

(21) Appl. No.: 13/705,859

(22) Filed: Dec. 5, 2012

(65) Prior Publication Data

US 2013/0182161 A1      Jul. 18, 2013

(30) Foreign Application Priority Data

Jun. 9, 2011      (JP) .................................. 2011-129250

(51) Int. Cl.
*H04N 5/335*      (2011.01)
*H04N 5/378*      (2011.01)
(Continued)

(52) U.S. Cl.
CPC ............... *H04N 5/335* (2013.01); *H04N 5/378* (2013.01); *H04N 5/23245* (2013.01); *H04N 5/343* (2013.01); *H04N 5/351* (2013.01); *H04N 5/37452* (2013.01); *H04N 5/37457* (2013.01)

(58) Field of Classification Search
CPC ... H04N 5/23245; H04N 5/335; H04N 5/369; H04N 5/3696; H04N 5/374; H04N 5/3741; H04N 5/3742; H04N 5/3745; H04N 5/376; H04N 5/378
USPC ............... 348/294, 300–302, 308; 250/208.1; 257/290, 291, 444
See application file for complete search history.

(56) References Cited

U.S. PATENT DOCUMENTS 7,664,220 B2 *   2/2010   Ajioka .......................... 377/107
8,174,598 B2 *   5/2012   Ebihara ........................ 348/296
(Continued)

FOREIGN PATENT DOCUMENTS

JP      2002-344809 A      11/2002
JP      2006-049361 A      2/2006
(Continued)

OTHER PUBLICATIONS

Notice of Reasons for Rejection dated Mar. 3, 2015, issued in corresponding Japanese Application No. 2011-129250, w/English translation. (6 pages).

*Primary Examiner* — Daniel M Pasiewicz
(74) *Attorney, Agent, or Firm* — Westerman, Hattori, Daniels & Adrian, LLP

(57) ABSTRACT

A solid-state image pickup device includes: electrically coupled substrates on which circuit elements constituting a pixel are arranged; a photoelectric conversion element included in the pixel; a reading circuit that reads from the pixel, a signal based on a signal generated by the photoelectric conversion element; and first to n-th circuit sets each including a circuit element that reads a signal by a corresponding one of first to n-th reading modes. n is an integer such that n≥2. The circuit elements arranged on one of the substrates is used to complete operations from generation of the signal by the photoelectric conversion element to reading of the signal by at least one of the first to n-th reading modes. The photoelectric conversion element, the reading circuit, and at least one of the first to n-th circuit sets are arranged on the one of the substrates.

34 Claims, 16 Drawing Sheets

(51) Int. Cl.
*H04N 5/232* (2006.01)
*H04N 5/343* (2011.01)
*H04N 5/3745* (2011.01)
*H04N 5/351* (2011.01)

(56) References Cited

U.S. PATENT DOCUMENTS

| | | | |
|---|---|---|---|
| 8,742,310 B2* | 6/2014 | Guezzi et al. | 250/208.1 |
| 2006/0023109 A1* | 2/2006 | Mabuchi et al. | 348/340 |
| 2008/0284888 A1* | 11/2008 | Kobayashi | 348/308 |
| 2010/0309340 A1* | 12/2010 | Border et al. | 348/241 |
| 2012/0057056 A1* | 3/2012 | Oike | 348/294 |
| 2012/0307030 A1* | 12/2012 | Blanquart | 348/76 |
| 2013/0063653 A1* | 3/2013 | Kita | 348/362 |
| 2013/0107093 A1* | 5/2013 | Aoki | 348/302 |
| 2013/0126708 A1* | 5/2013 | Blanquart | 250/208.1 |
| 2013/0126709 A1* | 5/2013 | Blanquart | 250/208.1 |

FOREIGN PATENT DOCUMENTS

| | | |
|---|---|---|
| JP | 2006-203775 A | 8/2006 |
| JP | 2010-183195 A | 8/2010 |
| JP | 2010-219339 A | 9/2010 |

* cited by examiner

SOLID-STATE IMAGE PICKUP DEVICE, IMAGE PICKUP DEVICE, AND SIGNAL READING METHOD

BACKGROUND OF THE INVENTION

1. Field of the Invention

The present invention relates to a solid-state image pickup device and an image pickup device, which include a plurality of electrically-coupled substrates on which circuit elements constituting pixels are placed. Additionally, the present invention relates to a signal reading method of reading signals from pixels.

2. Description of the Related Art

Recently, demand for digital cameras as image input devices has been increasing with the rapid spread of personal computers. There are several factors determining the quality of digital cameras. One of the factors is the number of pixels of an image pickup element, which is an important factor for determining the resolution of a picked-up image. For this reason, digital cameras having more than 12,000,000 pixels have been commercialized recently.

As image pickup elements, amplified solid-state image pickup devices as typified by MOS image sensors such as CMOS (complementary metal oxide semiconductor), and charge coupled solid-state image pickup devices as typified by CCD (charge coupled device), are known. Those solid-state image pickup devices are widely used in digital still cameras, digital video cameras, and the like. Recently, as solid-state image pickup devices mounted on mobile devices such as cellular phones with cameras or PDA (personal digital assistants), MOS solid-state image pickup devices with low power voltage have been widely used in terms of power consumption or the like.

Regarding such MOS solid-state image pickup devices, various solid-state image pickup devices have conventionally been proposed, such as a solid-state image pickup device in which a semiconductor chip having a pixel region on which multiple pixels are arranged and a semiconductor chip on which a signal processing circuit is formed are electrically coupled to constitute one device. For example, Japanese Patent Laid-Open Publication No. 2006-49361 discloses a solid-state image pickup device including: a semiconductor chip on which micro pads are formed on a wiring layer side for each unit pixel cell or each cell including multiple pixels; and a signal processing chip on which micro pads are formed on a wiring layer side at positions corresponding to those of the micro pads on the semiconductor chip, the signal processing chip being coupled to the semiconductor chip through micro bumps.

FIG. 14 illustrates a configuration of a solid-state image pickup device of the related art. The solid-state image pickup device of the related art includes: a first substrate 201 having a MOS image sensor; and a second substrate 202 having a signal processing circuit, the first substrate 201 being placed over the second substrate 202. A light enters a surface of the first substrate 201 which opposes another surface thereof to be coupled to the second substrate 202. In other words, the first substrate 201 is configured to have a surface on which a wiring layer is formed, and another surface which opposes that surface with the wiring layer formed and which receives a light.

Multiple micro pads 203 are formed on the wiring layer of the first substrate 201, for each cell including unit pixels or for each cell including multiple pixels, as will be explained later. Additionally, multiple micro pads 204 corresponding to the micro pads 203 on the first substrate 201 are formed on a surface of the second substrate 202 on a wiring layer side. The first substrate 201 is placed over the second substrate 202 such that the micro pads 203 face the corresponding micro pads 204. The micro pads 203 and the micro pads 204 are electrically coupled via micro bumps 205 and thus integrated with one another. The micro pads 203 and 204 are formed so as to be smaller than normal pads.

The second substrate 202 is formed so as to be larger in area than the first substrate 201. Normal pads 206 are arranged on a surface of the second substrate 202, and are positioned outside the first substrate 101 in plan view. The pads 206 form an interface with a system other than the system including the two substrates.

FIG. 15 illustrates a configuration of the first substrate 201. The first substrate 201 includes: a pixel unit 208 on which multiple pixel cells 207 are two-dimensionally arranged; and a control circuit 209 that controls the pixel cells 207.

FIG. 16 illustrates a circuit configuration of the pixel cell 207 of the first substrate 201. Here, one pixel cell includes four pixels. The pixel cell 207 includes four photoelectric conversion elements 221A, 221B, 221C, and 221D. The photoelectric conversion elements 221A, 221B, 221C, and 221D are coupled respectively to sources of transfer transistors 222A, 222B, 222C, and 222D. Gates of the transfer transistors 222A, 222B, 222C, and 222D are coupled respectively to transfer wires 227A, 227B, 227C, and 227D supplied with transfer pulses. Drains of the transfer transistors 222A, 222B, 222C, and 222D are coupled commonly to a source of a reset transistor 223. A charge retention unit FD called floating diffusion is coupled to a gate of an amplifier transistor 224. The charge retention unit FD is positioned between the source of the reset transistor 223 and a drain of each of the transfer transistors 222A, 222B, 222C, and 222D.

A drain of the reset transistor 223 is coupled to a power wire 232. A gate of the reset transistor 223 is coupled to a reset wire 228 supplied with a reset pulse. A drain of an activating transistor 225 is coupled to the power wire 232. A source of the activating transistor 225 is coupled to a drain of the amplifier transistor 224. A gate of the activating transistor 225 is coupled to an activation wire 229 supplied with an activation pulse. A source of the amplifier transistor 224 is coupled to a drain of an injection transistor 230. A source of the injection transistor 230 is coupled to a ground potential. A gate of the injection transistor 230 is coupled to an injection wire 231 supplied with an injection pulse. The midpoint connecting the amplifier transistor 224 and the injection transistor 230 is coupled to an output terminal 226.

The photoelectric conversion elements 221A, 221B, 221C, and 221D are, for example, photodiodes. The photoelectric conversion elements 221A, 221B, 221C, and 221D generate signal charge based on the incident light and store the generated signal charge. The transfer transistors 222A, 222B, 222C, and 222D are transistors that transfer the signal charge charged in the photoelectric conversion elements 221A, 221B, 222C, and 221D to the charge retention unit FD. The transfer transistors 222A, 222B, 222C, and 222D are on/off controlled by transfer pulses supplied from the control circuit 209 via the transfer wires 227A, 227B, 227C, and 227D. The charge retention unit FD constitutes an input unit of the amplifier transistor 224. The charge retention unit FD is a floating diffusion capacitor that temporarily stores the signal charge transferred from the photoelectric conversion elements 221A, 221B, 221C, and 221D.

The reset transistor 223 is a transistor that resets the charge retention unit FD. The reset transistor 223 is on/off controlled by the reset pulse supplied from the control circuit 209 via the reset wire 228. It is also possible to reset the photoelectric conversion elements 221A, 221B, 221C, and 221D by simultaneously turning on the reset transistor 223 and the transfer transistors 222A, 222B, 222C, and 222D.

The amplifier transistor 224 is a transistor that amplifies a signal based on the signal charge stored in the charge retention unit FD and outputs the amplified signal from the source thereof. The activating transistor 225 and the injection transistor 230 are transistors that supply to the amplifier transistor 224, a current that drives the amplifier transistor 224. The activating transistor 225 is on/off controlled by an activation pulse supplied from the control circuit 209 via the activation wire 229. The injection transistor 230 is on/off controlled by an injection pulse supplied from the control circuit 209 via an injection wire 231.

The photoelectric conversion elements 221A, 221B, 221C, and 221D; the transfer transistors 222A, 222B, 222C, and 222D; the reset transistor 223; the amplifier transistor 224; the activating transistor 225; and the injection transistor 230 constitute the one pixel cell 207 including four pixels. In the case of the related art, a vertical signal line for outputting a signal to be read out of the substrate is not formed on the first substrate 201.

Hereinafter, operation of the pixel cell 207 is explained with reference to FIG. 17. Firstly, an injection pulse Pn1 is applied to the injection transistor 230 via the injection wire 231, thereby turning on the injection transistor 230. Thus, the voltage of the output terminal 226 is fixed to 0V. Then, a reset pulse Pr is applied to the reset transistor 223 via the reset wire 228, thereby turning on the reset transistor 223. Thus, the voltage of the charge retention unit FD is reset to high level (power voltage). When the voltage of the charge retention unit FD becomes high level, the amplifier transistor 224 turns on. Then, the application of the injection pulse Pn1 is released, thereby turning off the injection transistor 230. Then, an activation pulse Pk1 is applied to the activating transistor 225 via the activation wire 229, thereby turning on the activating transistor 225. As a result of the activating transistor 225 turning on, the voltage of the output terminal 226 increases up to the voltage corresponding to the voltage of the charge retention unit FD. The voltage of the output terminal 226 at that time is referred to as the reset level.

Then, the application of the activation pulse Pk1 is released, thereby turning off the activating transistor 225. Then, a transfer pulse Pt1 is applied to the transfer transistor 222A via the transfer wire 227A, thereby turning on the transfer transistor 222A. Thus, the signal charge of the corresponding photoelectric conversion element 221A is transferred to the charge retention unit FD. Then, an injection pulse Pn2 is applied to the injection transistor 230 via the injection wire 231, thereby turning on the injection transistor 230. Thus, the voltage of the output terminal 226 becomes 0V. Then, an activation pulse Pk2 is applied to the activating transistor 225 via the activation wire 229, thereby turning on the activating transistor 225. Thus, the voltage of the output terminal 226 increases up to the voltage corresponding to the voltage of the charge retention unit FD. The voltage of the output terminal 226 at that time is referred to as the signal level.

The signal based on the voltage of the output terminal 226 is input to the second substrate 202 via the micro bumps 205. The difference between the signal level and the reset level is detected in the second substrate 202, and a signal based on that difference is output from the solid-state image pickup device. Here, the explanation has been made with respect to the case where a signal is read from the photoelectric conversion element 221A which is one of the four photoelectric conversion elements 221A, 221B, 221C, and 221D. Similar operation is sequentially performed with respect to the other three photoelectric conversion elements 221B, 221C, and 221D.

By the above operation, exposing timings of the photoelectric conversion elements 221A, 221B, 221C, and 221D, which slightly differ thereamong, are substantially synchronized, thereby achieving synchronization of the upper and lower portions of the pixel unit 208. Therefore, it is possible to increase the image processing speed without causing image degradation at the time of reading signals.

The aforementioned related art is characterized in that the first substrate 201 having semi-manufactured pixels and the semi-manufactured second substrate 202 are used and mutually coupled by forming through holes or the like for coupling the two substrates, thereby completing the product. For this reason, neither the first substrate 201 having the semi-manufactured pixel, nor the semi-manufactured second substrate 202, cannot be products by themselves. For this reason, the related art is applicable for use to read signals using both the two substrates, but is not applicable for use to read signals using only one of the substrates. Specifically, in a case where a solid-state image pickup device compatible with multiple signal reading modes is configured, it is not possible to configure a solid-state image pickup device having both a function of reading signals using only one substrate by a predetermined reading mode and a function of reading signals using two substrates by another reading mode.

SUMMARY

A solid-state image pickup device according to one embodiment of the present invention includes, but is not limited to: a plurality of substrates on which circuit elements constituting a pixel are arranged, the plurality of substrates being electrically coupled to one another; a photoelectric conversion element included in the pixel; a reading circuit configured to read from the pixel, a signal based on a signal generated by the photoelectric conversion element; and first to n-th circuit sets each including a circuit element configured to read a signal by a corresponding one of first to n-th reading modes. n is an integer equal to or greater than two. The circuit elements arranged on one of the plurality of substrates is used to complete operations from generation of the signal by the photoelectric conversion element to reading of the signal by at least one of the first to n-th reading modes. The photoelectric conversion element, the reading circuit, and at least one of the first to n-th circuit sets which corresponds to the at least one of the first to n-th reading modes, are arranged on the one of the plurality of substrates.

A solid-state image pickup device according to another embodiment of the present invention includes, but is not limited to: first and second substrates on which circuit elements constituting a pixel are arranged, the first and second substrates being electrically coupled to each other. The first substrate includes, but is not limited to: a photoelectric conversion element included in the pixel; an output terminal included in the pixel, the output terminal being coupled to the photoelectric conversion element; a first output signal line coupled to the output terminal; and a switch coupled to the output terminal and the first output signal line. The second substrate includes, but is not limited to: an input terminal coupled to the output terminal; a capacitor coupled to the input terminal; and a second output signal line coupled to the capacitor.

An image pickup device according to another embodiment of the present invention includes, but is not limited to: a plurality of substrates on which circuit elements constituting a pixel are arranged, the plurality of substrates being electrically coupled to one another; a photoelectric conversion element included in the pixel; a reading circuit configured to read from the pixel, a signal based on a signal generated by the photoelectric conversion element; and first to n-th circuit sets each including a circuit element configured to read a signal by a corresponding one of first to n-th reading modes. n is an integer equal to or greater than two. The circuit elements arranged on one of the plurality of substrates is used to complete operations from generation of the signal by the photoelectric conversion element to reading of the signal by at least one of the first to n-th reading modes. The photoelectric conversion element, the reading circuit, and at least one of the first to n-th circuit sets which corresponds to the at least one of the first to n-th reading modes, are arranged on the one of the plurality of substrates.

An image pickup device according to another embodiment of the present invention includes, but is not limited to: first and second substrates on which circuit elements constituting a pixel are arranged, the first and second substrates being electrically coupled to each other. The first substrate includes, but is not limited to: a photoelectric conversion element included in the pixel; an output terminal included in the pixel, the output terminal being coupled to the photoelectric conversion element; a first output signal line coupled to the output terminal; and a switch coupled to the output terminal and the first output signal line. The second substrate includes, but is not limited to: an input terminal coupled to the output terminal; a capacitor coupled to the input terminal; and a second output signal line coupled to the capacitor.

A signal reading method according to another embodiment of the present invention includes, but is not limited to: reading, by at least one of a first reading mode and a second reading mode, a signal from a pixel of a solid-state image pickup device, the solid-state image pickup device including first and second substrates on which circuit elements constituting a pixel are arranged, and the first and second substrates being electrically coupled to each other. Reading the signal by the first reading mode includes, but is not limited to: generating a signal by a photoelectric conversion element on the first substrate, the photoelectric conversion element being included in the pixel; outputting the signal generated by the photoelectric conversion element from an output terminal on the first substrate, the output terminal being included in the pixel and coupled to the photoelectric conversion element; and outputting the signal output from the output terminal to a first output signal line on the first substrate, the first output signal line being coupled to the output terminal. Reading the signal by the second reading mode includes, but is not limited to: generating a signal by the photoelectric conversion element; storing the signal generated by the photoelectric conversion element into a capacitor on the second substrate via the output terminal and an input terminal on the second substrate, the capacitor being coupled to the input terminal, and the input terminal being coupled to the output terminal; and outputting the signal stored in the capacitor to a second output signal line on the second substrate, the second output signal line being coupled to the capacitor.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

Hereinafter, embodiments of the present invention will be described with reference to drawings. Detailed explanations below include specific detailed contents as an example. Those skilled in the art will recognize that many alternative embodiments can be accomplished without departing from the scope of the present invention. Accordingly, the embodiments illustrated herein for explanatory purposes do not limit the generality of the claimed inventions, and the claimed inventions are not limited to the embodiments.

First Embodiment

Figure 1:
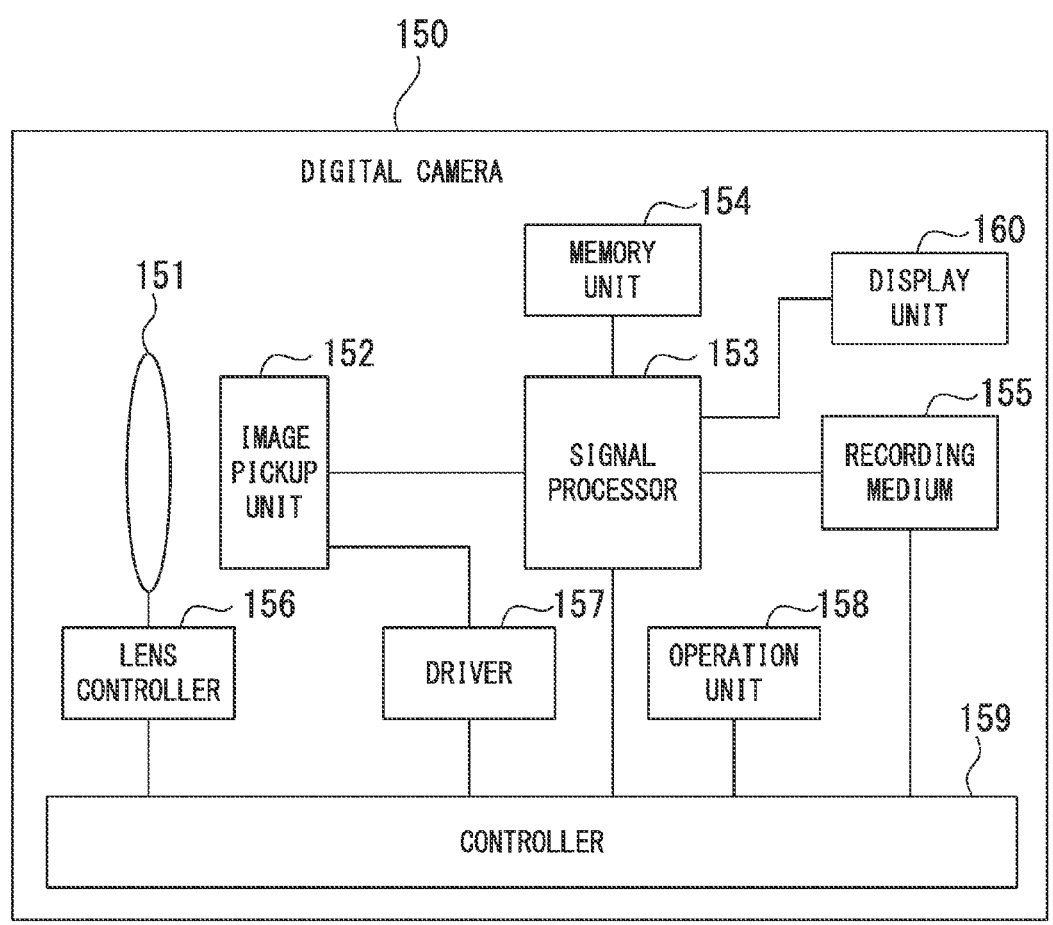
FIG. 1 is a block diagram illustrating a configuration of an image pickup device according to a first embodiment of the present invention.

Hereinafter, a first embodiment of the present invention is explained. FIG. 1 illustrates a configuration of an image pickup device (digital camera 150) including a solid-state image pickup device according to the first embodiment. An image pickup device according to one embodiment of the present invention is not limited to a digital camera as long as the image pickup device is an electronic device having an image pickup function, such as a digital video camera, or an endoscope.

The digital camera 150 shown in FIG. 1 includes: a lens unit 151; an image pickup unit 152; a signal processor 153; a memory unit 154; a recording medium 155; a lens controller 156; a driver 157; an operation unit 158; a controller 159; and a display unit 160. Each block shown in FIG. 1 can be implemented by various hardware components including: electric circuit components such as a CPU and a memory of a computer; optical components such as lenses; and operation components such as buttons and switches. Further, each block shown in FIG. 1 can be implemented by software, such as computer programs. Here, each block shown in FIG. 1 is described as a functional block implemented as a combination of those hardware and software. Accordingly, those skilled in the art will recognize that various embodiments of those functional blocks can be implemented as a combination of hardware and software.

The lens unit 151 includes a zoom lens and a focus lens. The lens 151 reflects a light from an object onto a light receiving surface of the image pickup unit 152 to form an object image. The lens controller 156 controls zoom, focus, aperture, and the like of the lens unit 151. The light receiving surface of the image pickup unit 152 receives the light via the lens unit 151 to form an image. The image pickup unit 152 constitutes the solid-state image pickup device. The image pickup unit 152 converts the object image formed on the light receiving surface into an image signal, and outputs the image signal. Multiple pixels are two-dimensionally arranged on the light receiving surface of the image pickup unit 152 in row and column directions.

The signal processor 153 performs a predetermined process on the image signal output from the image pickup unit 152. The process performed by the signal processor 153 includes various corrections of image data, compression of image data, and the like. The memory unit 154 temporarily stores image data.

The display unit 160 performs: displaying of motion images (live view images) or still images; displaying of motion images and still images recorded on the recording medium 155; displaying of a state of the digital camera 150; and the like. The recording medium 155 includes a semiconductor memory or the like for recording and/or reading image data. The recording medium 155 is detachably built in the digital camera 150.

The driver 157 drives the image pickup unit 152 and controls operation of the image pickup unit 152. The operation unit 158 includes soft buttons for an operator to input an order to start image pickup. The operation unit 158 detects the order input by the operator and outputs a signal corresponding to the contents of the order. The controller 159 controls the entire digital camera 150. Additionally, the controller 159 outputs a control signal to each unit included in the digital camera 150, according to the signal output from the operation unit 158.

Figure 2:
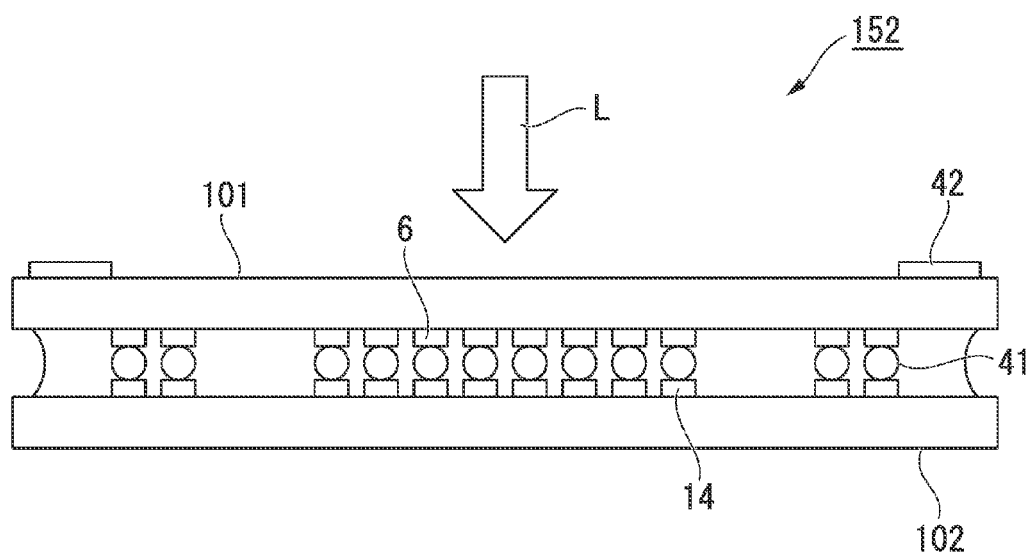
FIG. 2 is a cross-sectional view illustrating an image pickup unit included in the image pickup device according to the first embodiment of the present invention.

FIG. 2 illustrates a configuration of the image pickup unit 152. The image pickup unit 152 has a structure such that one of two substrates (the first substrate 101, the second substrate 102) on which circuit elements (such as photoelectric conversion elements, transistors, and capacitors) constituting pixels are arranged is placed over the other one. Each of the circuit elements constituting pixels is arranged on the first substrate 101 or the second substrate 102. The first substrate 101 and the second substrate 102 are electrically coupled to each other so that electric signals are communicable therebetween at the time of driving the pixels.

Photoelectric conversion elements are formed on one of two main surfaces of the first substrate 101 (surfaces having larger in surface area than side surfaces), which is on the side irradiated with a light L. The light irradiating the first substrate 101 enters the photoelectric elements. Multiple micro pads, as output terminals 6 on the side of the first substrate 101, are formed on the other main surface opposing the main surface irradiated with the light L. The micro pads on the first substrate 101 are electrodes for coupling the first substrate 101 to the first substrate 102. Additionally, multiple micro pads, as input terminals 14 on the side of the second substrate 102, are formed on one of two main surfaces of the second substrate 102, which faces the first substrate 101. The the micro pads on the second substrate 102 correspond in position to the output terminals 6 on the first substrate 101. The micro pads on the second substrate 102 are electrodes for coupling the second substrate 102 to the first substrate 101.

Micro bumps 41 are sandwiched between the output terminals 6 and the input terminals 14. The first substrate 101 is placed over, and is integrated with, the second substrate 102 so that the output terminals 6 and the respective input terminals 14, which are micro pads, face one another and are electrically coupled to one another via the micro bumps 41. The output terminals 6, the micro bumps 41, and the input terminals 14 constitute a coupler that couples the first substrate 101 and the second substrate 102. Signals based on signal charge generated by the photoelectric conversion elements arranged on the first substrate 101 are output to the second substrate 102 via the output terminals 6, the micro bumps 41, and the input terminals 14. Pads 42 are formed on a peripheral portion of the main surface irradiated with the light L, which is one of the two main surfaces of the first substrate 101. The pads 42 are used as interfaces with a system other than the first substrate 101 and the second substrate 102.

In the case of FIG. 2, the micro bumps are provided between the micro pads to couple the first substrate 101 and the second substrate 102. However, the configuration of the present embodiment is not limited thereto. For example, instead of providing the micro bumps, the micro pads on the surface of the first substrate 101 may be directly attached onto the micro pads on the surface of the second substrate 102, thereby coupling the first substrate 101 and the second substrate 102.

In a case where communication of signals between the first substrate 101 and the second substrate 102 are necessary with respect to configurations other than the configuration of the pixels, the first substrate 101 and the second substrate 102 may be coupled using the micro pads and the micro bumps or by directly attaching the micro pads on the first substrate 101 onto the micro pads on the second substrate 102, in a similar manner to the configuration of the pixel.

The image pickup unit 152 of the first embodiment is compatible with multiple signal reading modes. A reading method indicates a series of sequences from exposure to reading, which are performed in pixels. Specifically, the image pickup unit 152 is compatible with two types of reading modes (a global shutter mode, a rolling shutter mode). In the global shutter mode, signals are read via both the first substrate 101 and the second substrate 102 (global shutter operation). In the rolling shutter mode, signals are read only via the first substrate 101 (rolling shutter operation). For example, signals are read by the global shutter operation while the image-pickup device operates in a still image pickup mode (second operation mode), and signals are read by the rolling shutter operation while the image-pickup device operates in a motion image pickup mode (first operation mode).

Figure 3:
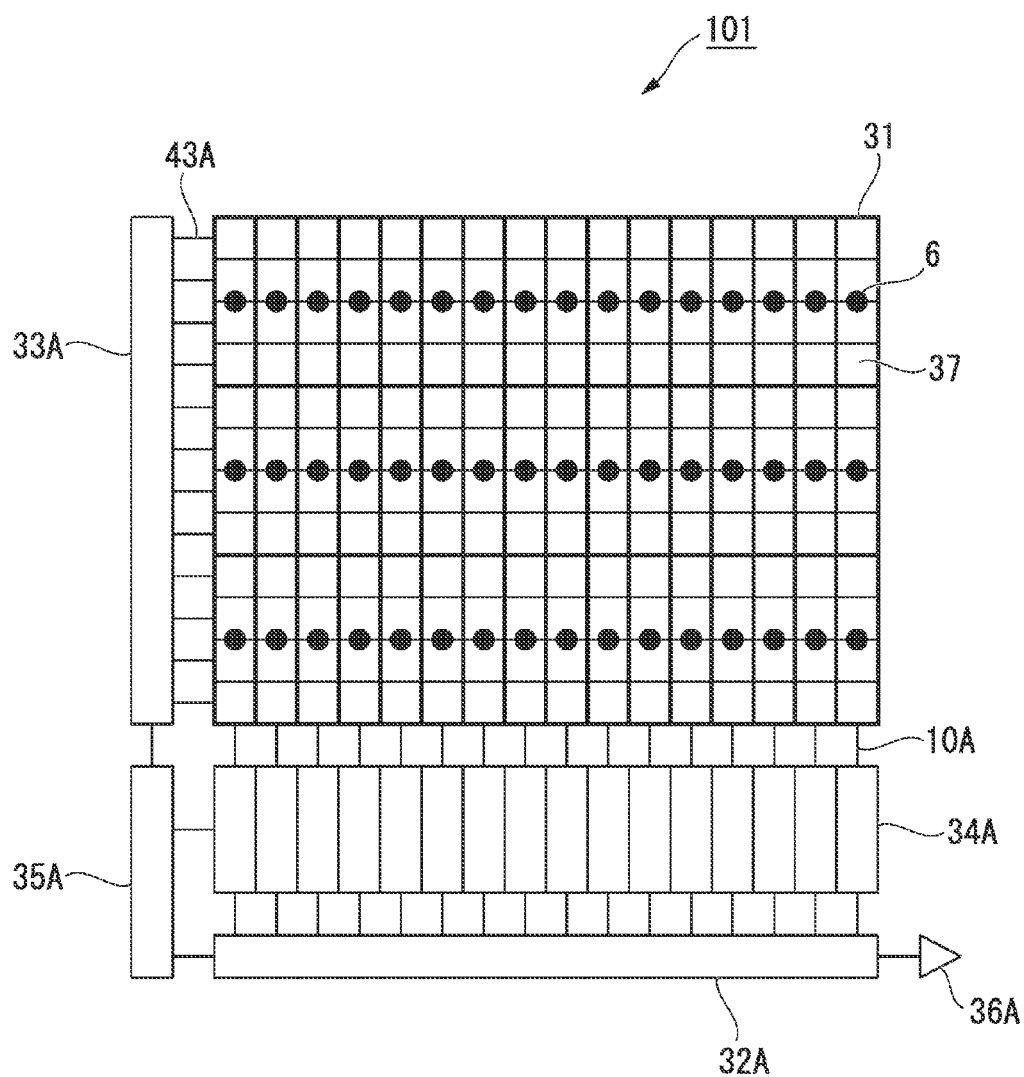
FIG. 3 is a block diagram illustrating a configuration of a first substrate included in the image pickup device according to the first embodiment of the present invention.

FIG. 3 illustrates a configuration of the first substrate 101. The first substrate 101 includes: a unit pixel cell 31; a horizontal drive circuit 32A; a vertical drive circuit 33A; a column circuit unit 34A; a control circuit 35A; and an output circuit 36A.

The unit pixel cell 31 includes multiple unit pixels 37. In the first embodiment, the unit pixel cell 31 includes four unit pixels 37 arranged in a vertical direction. The unit pixels 37 are arranged in a two-dimensional matrix. Each of the unit pixels 37 belongs to one of the unit pixels (groups) 31. The arrangement of the unit pixel shown in FIG. 2 is just one example, and the number of rows and the number of columns may be two or more. In the first embodiment, a region defined by all the unit pixels 37 included in the image pickup unit 152 is used as a reading target region. However, part of the region defined by all the unit pixels 37 included in the image pickup unit 152 may be used as a reading target region. Preferably, the reading target region at least includes all pixels in an effective pixel region. The reading target region may include optical black pixels (pixels where a light is always blocked) arranged outside the effective pixel region. For example, signals read from the optical black pixels are used to correct dark current elements.

The control circuit 35A receives from a unit outside the first substrate 101, an input clock, data to specify an operation mode, or the like. According to the received input clock or the data, the control circuit 35A supplies clocks or pulses required for each unit to operate as will be explained later. The vertical drive circuit 33A selects a row of the arrangement of the unit pixels 37 and supplies a control signal that controls operation of the unit pixels 37, to the unit pixels 37 on the row via a control signal line 43A provided for each row. The vertical drive circuit 33A supplies the control signal to the unit pixels 37, thereby controlling operation of the unit pixels 37. According to the control signal supplied from the vertical drive circuit 33A, the unit pixels 37 output signals to a vertical signal line 10A provided for each column. The vertical signal line 10A outputs the signals read from the unit pixels 37 to the column circuit unit 34A provided for each column.

The column circuit unit 34A performs on the signals read to the vertical signal line 10A, processes such as CDS (correlated double sampling, i.e., a process of cancelling fixed pattern noises), signal amplification, and AD conversion. The horizontal drive circuit 32A sequentially selects the column circuit units 34A, and outputs from the output circuit 36A, the signals processed by the column circuit units 34A. The output terminals 6 will be explained later.

Figure 4:
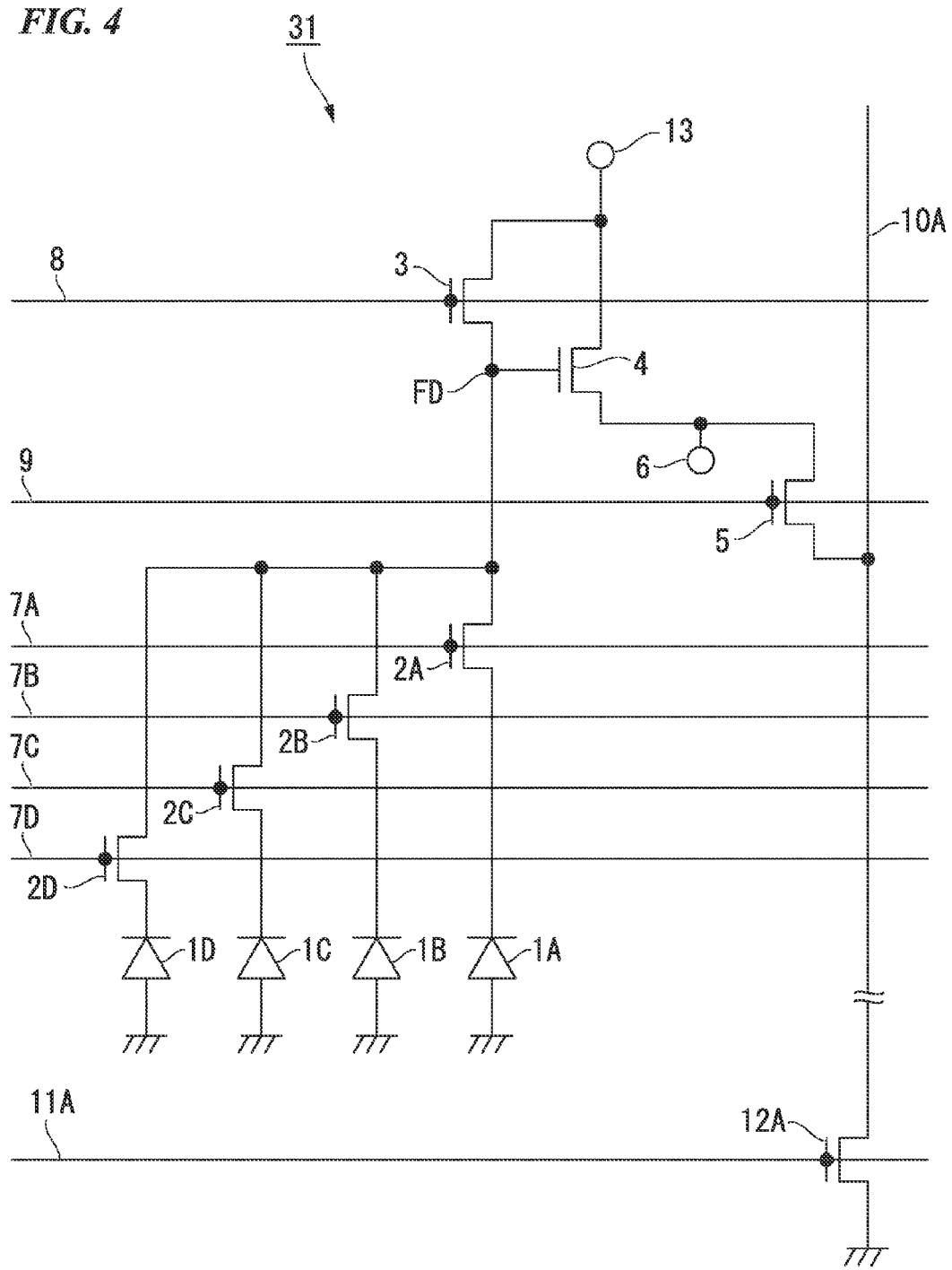
FIG. 4 is a circuit diagram illustrating a circuit configuration of a unit pixel cell of the image pickup unit included in the image pickup device according to the first embodiment of the present invention.

FIG. 4 illustrates a circuit configuration of the unit pixel cell 31 included in the first substrate 101. For the following explanation purposes, a source and a drain of each transistor are not fixed since it is possible to arbitrarily change polarity of the transistor. For this reason, one of the source and the drain of each transistor is referred to as one terminal, and the other one of the source and the drain of each transistor is referred to as the other terminal.

Each of the photoelectric conversion elements 1A, 1B, 1C, and 1D is coupled to one terminal of the corresponding one of the four transfer transistors 2A, 2B, 2C, and 2D. Gates of the transfer transistors 2A, 2B, 2C, and 2D are coupled respectively to the transfer transistors 7A, 7B, 7C, and 7D supplied with transfer pulses. The other terminals of the transfer transistors 2A, 2B, 2C, and 2D are coupled commonly to one terminal of the reset transistor 3. A charge retention unit FD between the reset transistor 3 and each of the transfer transistors 2A, 2B, 2C, and 2D is coupled to a gate of the amplifier transistor 4.

The other terminal of the reset transistor 3 is coupled to a power wire 13. A gate of the reset transistor 3 is coupled to a reset wire 8 supplied with a reset pulse. One terminal of the amplifier transistor 4 is coupled to the power wire 13. One terminal of a select transistor 5 is coupled to the other terminal of the amplifier transistor 4, and the other terminal of the select transistor 5 is coupled to the vertical signal line 10A. A gate of the select transistor 5 is coupled to a select wire 9 supplied with a select pulse. The midpoint connecting the amplifier transistor 4 and the select transistor 5 is coupled to the output terminal 6.

One terminal of the vertical signal line 10A is coupled to one terminal of a load transistor 12A. The other terminal of the vertical signal line 10A is coupled to a column circuit unit 34A. The load transistor 12A is provided for each column corresponding to the vertical signal line 10A. The other terminal of the load transistor 12A is coupled to a ground potential. A gate of the load transistor 12A is coupled to a load wire 11A. The transfer wires 7A, 7B, 7C, and 7D, the reset wire 8, the select wire 9, and the load wire 11A constitute a control signal line 43A.

The photoelectric conversion elements 1A, 1B, 1C, and 1D are, for example, photodiodes. The photoelectric conversion elements 1A, 1B, 1C, and 1D generate signal charge based on the incident light, and store the generated signal charge. The transfer transistors 2A, 2B, 2C, and 2D are transistors that transfer to the charge retention unit FD, signal charge stored by the photoelectric conversion elements 1A, 1B, 1C, and 1D. The transfer transistors 2A, 2B, 2C, and 2D are on/off controlled by transfer pulses supplied from the vertical drive circuit 33A via the transfer wires 7A, 7B, 7C, and 7D. The charge retention unit FD constitutes an input unit of the amplifier transistor 4. The charge retention unit FD is a floating diffusion capacitor that temporarily stores the signal charge transferred from the photoelectric conversion elements 1A, 1B, 1C, and 1D.

The reset transistor 3 is a transistor that resets the charge retention unit FD. The reset transistor 3 is on/off controlled by a reset pulse supplied from the vertical drive circuit 33A via the reset wire 8. Resetting by the charge retention unit FD is to control the amount of charge stored in the charge retention unit FD, thereby setting a state (voltage) of the charge retention unit FD to a reference state (the reference voltage, the reset level). It is possible to simultaneously turn on the reset transistor 3 and the transfer transistors 2A, 2B, 2C, and 2D, thereby resetting the photoelectric conversion elements 1A, 1B, 1C, and 1D.

The amplifier transistor 4 is a transistor that outputs from the other terminal thereof, an amplified signal generated by amplifying a signal based on the signal charge stored in the charge retention unit FD. The select transistor 5 is a transistor that selects the unit pixel cell 31 that outputs the signal to the vertical signal line 10A, and transfers the output of the amplifier transistor 4 to the vertical signal line 10A. The select transistor 5 is on/off controlled by a select pulse supplied from the vertical drive circuit 33A via the select wire 9. In the global shutter operation, the select transistor 5 is turned off, and a path passing both the first substrate 101 and the second substrate 102 is selected as a path for reading signals.

The load transistor 12A is a transistor that operates as a load for the amplifier transistor 4 and supplies to the amplifier transistor 4, a current that drives the amplifier transistor 4. A state of the load transistor 12A is controlled by a voltage signal supplied from the vertical drive circuit 33A via a load wire 11A. The output terminal 6 outputs to the second substrate 102, the amplified signal output from the amplifier transistor 4.

The photoelectric conversion elements 1A, 1B, 1C, and 1D; the transfer transistors 2A, 2B, 2C, and 2D; the reset transistor 3; the amplifier transistor 4; and the select transistor 5 constitute one unit pixel cell 31 including four pixels. The reset transistor 3, the amplifier transistor 4, and the select transistor 5 are shared by the four unit pixels 37.

Figure 5:
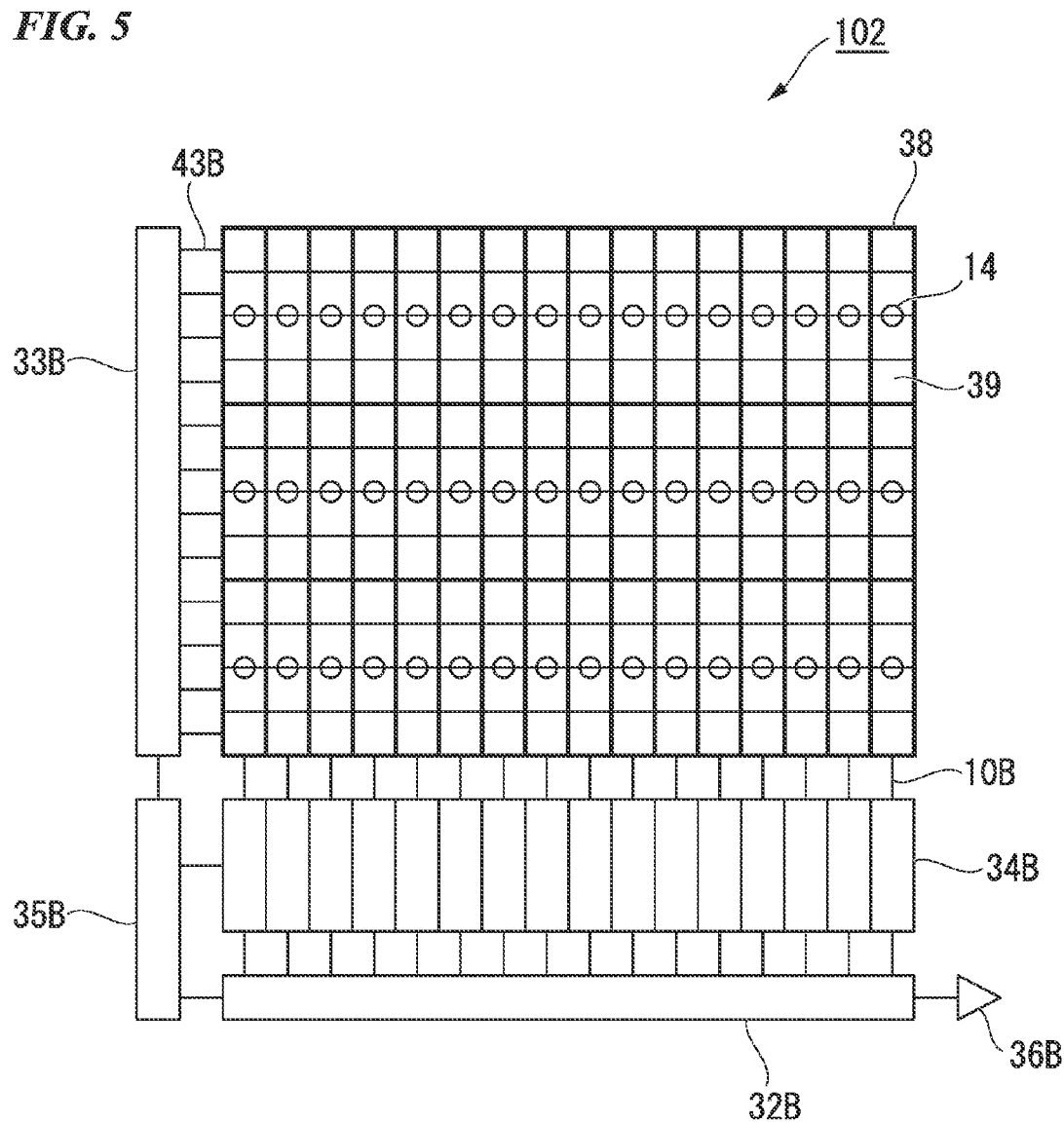
FIG. 5 is a block diagram illustrating a configuration of a second substrate included in the image pickup device according to the first embodiment of the present invention.

FIG. 5 illustrates a configuration of the second substrate 102. The second substrate 102 includes: a unit memory cell 38; a horizontal drive circuit 32B; a vertical drive circuit 33B; a column circuit unit 34B; a control circuit 35B; and an output circuit 36B.

The unit memory cell 38 includes multiple unit memory units 39. In the first embodiment, the unit memory cell 38 includes four unit memory units 39 arranged in the vertical direction. The unit memory units 39 are arranged in a two-dimensional matrix. Each of the unit memory units 39 belongs to one of the unit memory cells (groups) 38. Each unit memory unit 39 corresponds to the unit pixel 37. In the first embodiment, the unit pixel 37 is distinguished from the unit memory unit 39. However, the unit pixel 37 and the unit memory unit 39 may be grouped into one pixel. The arrangement of the unit memory units shown in FIG. 5 is just one example, and the number of rows and columns may be two or more.

The control circuit 35B receives from a unit outside the first substrate 102, an input clock, data to specify an operation mode, or the like. According to the received input clock or the data, the control circuit 35B supplies clocks or pulses required for each unit to operate as will be explained later. The vertical drive circuit 33B selects a row of the arrangement of the unit memory units 39 and supplies a control signal that controls operation of the unit memory units 39, to the unit memory units 39 on that row via a control signal line 43B provided for each row. The vertical drive circuit 33B supplies the control signal to the unit memory units 39, thereby controlling operation of the unit memory units 39. According to the control signal supplied from the vertical drive circuit 33B, the unit memory units 39 output signals to a vertical signal line 10B provided for each column. The vertical signal line 10B outputs the signals read from the unit memory units 39 to a column circuit unit 34B provided for each column.

The column circuit unit 34B performs on the signals read to the vertical signal line 10B, processes such as CDS, signal amplification, and AD conversion. The horizontal drive circuit 32B sequentially selects the column circuit units 34B, and outputs from the output circuit 36B, the signals processed by the column circuit units 34B. The input terminals 14 will be explained later.

Figure 6:
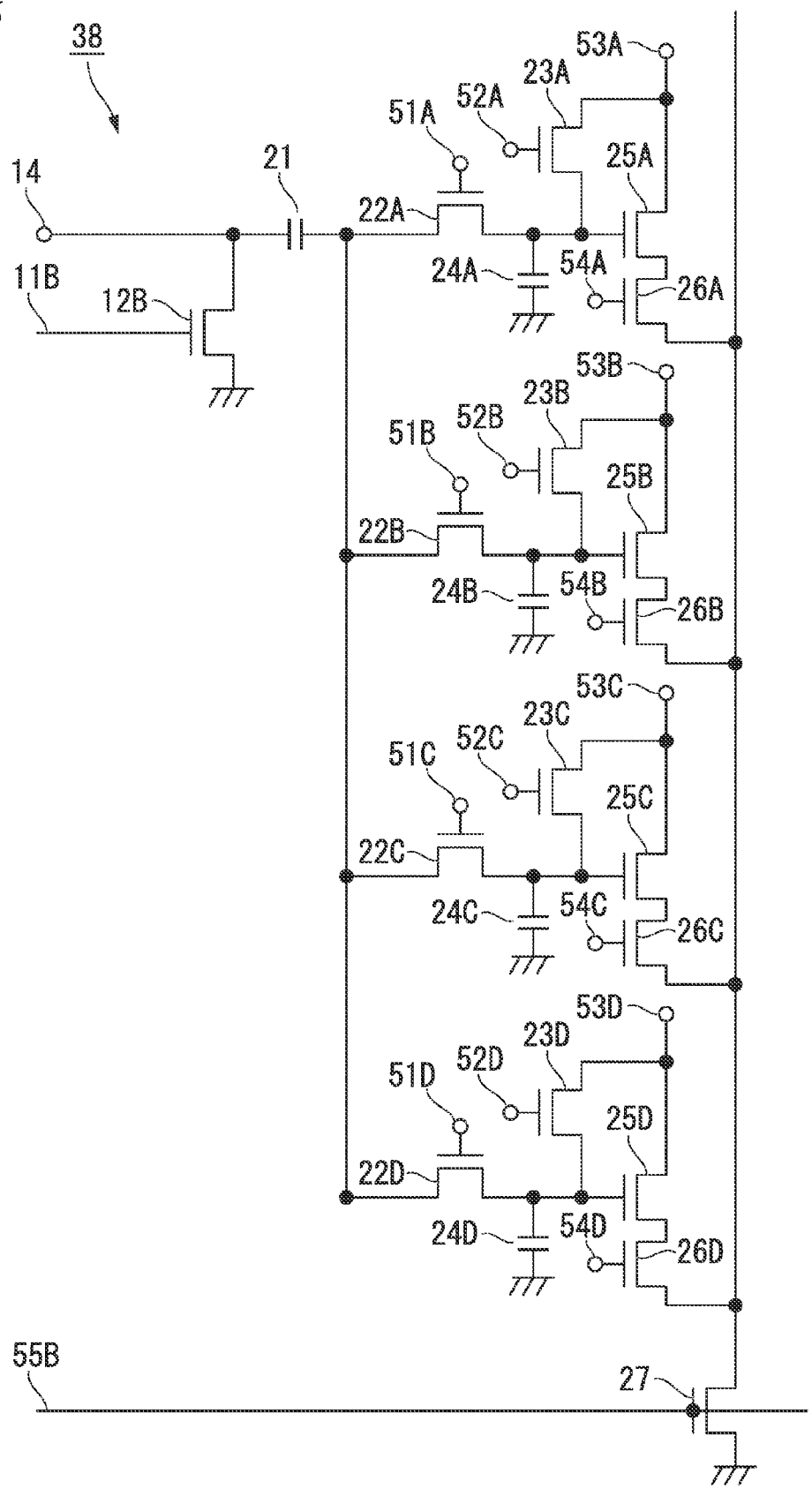
FIG. 6 is a circuit diagram illustrating a circuit configuration of a unit memory cell included in the image pickup unit included in the image pickup device according to the first embodiment of the present invention.

FIG. 6 illustrates a circuit configuration of the unit memory cell 38 included in the second substrate 102. An input terminal 14 is a terminal directly or indirectly coupled to an output terminal 6 of the unit pixel cell 31, and is coupled to one terminal of the load transistor 12B. The other terminal of the load transistor 12B is coupled to a ground potential. A gate of the load transistor 12B is coupled to a load wire 11B.

One terminal of a clamp capacitor 21 is coupled to the input terminal 14. One terminal of each of sample transistors 22A, 22B, 22C, and 22D is coupled to the other terminal of the clamp capacitor 21. Gates of the sample transistors 22A, 22B, 22C, and 22D are coupled respectively to sample wires 51A, 51B, 51C, and 51D supplied with sample pulses.

One terminal of each of the reset transistors 23A, 23B, 23C, and 23D is coupled to the corresponding one of power wires 53A, 53B, 53C, and 53D. The other terminals of the reset transistors 23A, 23B, 23C, and 23D are coupled respectively to the other terminals of sample transistors 22A, 22B, 22C, and 22D. Gates of the reset transistors 23A, 23B, 23C, and 23D are coupled to reset wires 52A, 52B, 52C, and 52D supplied with reset pulses.

One terminal of each of analog memories 24A, 24B, 24C, and 24D is coupled to the corresponding one of the other terminals of the sample transistors 22A, 22B, 22C, and 22D. The other terminals of the analog memories 24A, 24B, 24C, and 24D are coupled to the ground potential. One terminal of each of amplifier transistors 25A, 25B, 25C, and 25D is coupled to the corresponding one of the power wires 53A, 53B, 53C, and 53D. Gates of the amplifier transistors 25A, 25B, 25C, and 25D, which constitute input units thereof, are coupled respectively to the other terminals of the sample transistors 22A, 22B, 22C, and 25D.

One terminal of each of the select transistors 26A, 26B, 26C, and 26D is coupled to the corresponding one of the other terminals of the amplifier transistors 25A, 25B, 25C, and 25D. The other terminals of the select transistors 26A, 26B, 26C, and 26D are coupled to the vertical signal line 10B. Gates of the select transistors 26A, 26B, 26C, and 26D are coupled respectively to the select wires 54A, 54B, 54C, and 54D supplied with select pulses.

One end of the vertical signal line 10B is coupled to one terminal of the load transistor 27. The other end of the vertical signal line 10B is coupled to the column circuit unit 34B. The load transistor 27 is provided for each column corresponding to the vertical signal line 10B. The other terminal of the load transistor 27 is coupled to the ground potential. A gate of the load transistor 27 is coupled to a load wire 55B. The load wire 11B; the sample wires 51A, 51B, 51C, and 51D; the reset wires 52A, 52B, 52C, and 52D; the select wires 54A, 54B, 54C, and 54D; and the load wire 55B constitute a control signal line 43B.

The input terminal 14 receives the signal output from the first substrate 101. The load transistor 12B is a transistor that operates as a load for the amplifier transistor 4 and supplies to the amplifier transistor 4, a current that drives the amplifier transistor 4. A state of the load transistor 12B is controlled by a voltage signal supplied from the vertical drive circuit 33B via the load wire 11B.

The clamp capacitor 21 is a capacitor that clamps (fixes) the voltage level of the signal output from the input terminal 14. The sample transistors 22A, 22B, 22C, and 22D are transistors that sample-holds the voltage level of the other terminal of the clamp capacitor 21, and stores the voltage level in the analog memories 24A, 24B, 24C, and 24D. The sample transistors 22A, 22B, 22C, and 22D are on/off controlled by sample pulses supplied from the vertical drive circuit 33B via the sample wires 51A, 51B, 51C, and 51D.

The reset transistors 23A, 23B, 23C, and 23D are transistors that reset the analog memories 24A, 24B, 24C, and 24D. The reset transistors 23A, 23B, 23C, and 23D are on/off controlled by reset pulses supplied from the vertical drive circuit 33B via the reset wires 52A, 52B, 52C, and 52D. Resetting the analog memories 24A, 24B, 24C, and 24D is to control the amount of charge stored in analog memories 24A, 24B, 24C, and 24D, thereby setting the states of the analog memories 24A, 24B, 24C, and 24D to reference states (the reference voltages, the reset levels). The analog memories 24A, 24B, 24C, and 24D store the analog signals sample-hold by the sample transistors 22A, 22B, 22C, and 22D.

Capacitances of the analog memories 24A, 24B, 24C, and 24D are set to be larger than that of the charge retention unit FD. Preferably, a MIM (metal insulator metal) capacitor or a MOS (metal oxide semiconductor) capacitor, which is a capacitor with less leak current (dark current) per unit area, is used as the analog memories 24A, 24B, 24C, and 24D. Thereby, tolerance to noises is increased, thereby achieving high-quality signals.

The amplifier transistors 25A, 25B, 25C, and 25D are transistors that amplify signals which are input to the gates thereof and are based on signal charge stored in the analog memories 24A, 24B, 24C, and 24D, and output the amplified signals from the other terminals thereof. The select transistors 26A, 26B, 26C, and 26D are transistors that select a unit memory unit 39 and output the outputs of the amplifier transistors 25A, 25B, 25C, and 25D to the vertical signal line 10B. The select transistors 26A, 26B, 26C, and 26D are on/off controlled by select pulses supplied from the vertical drive circuit 33B via the select wires 54A, 54B, 54C, and 54D.

In the global shutter operation, the select transistors 26A, 26B, 26C, and 26D are turned on, a path passing the first substrate 101 and the second substrate 102 is selected as a path for reading signals. In the rolling shutter operation, the select transistors 26A, 26B, 26C, and 26D are turned off, a path passing only the first substrate 101 is selected as a path for reading signals.

The load transistor 27 is a transistor that operates as the load for the amplifier transistors 25A, 25B, 25C, and 25D, and supplies to the amplifier transistors 25A, 25B, 25C, and 25D, a current that drives the amplifier transistors 25A, 25B, 25C, and 25D. A state of the load transistor 27 is controlled by a voltage signal supplied from the vertical drive circuit 33B via the load wire 55B.

The load transistor 12B; the clamp capacitor 21; the sample transistors 22A, 22B, 22C, and 22D; the reset transistors 23A, 23B, 23C, and 23D; the analog memories 24A, 24B, 24C, and 24D; the amplifier transistors 25A, 25B, 25C, and 25D; and the select transistors 26A, 26B, 26C, and 26D constitute the one unit memory cell 38 including the four unit memory units 39. The load transistor 12B and the clamp capacitor 21 are shared by the four unit memory units 39.

Figure 7:
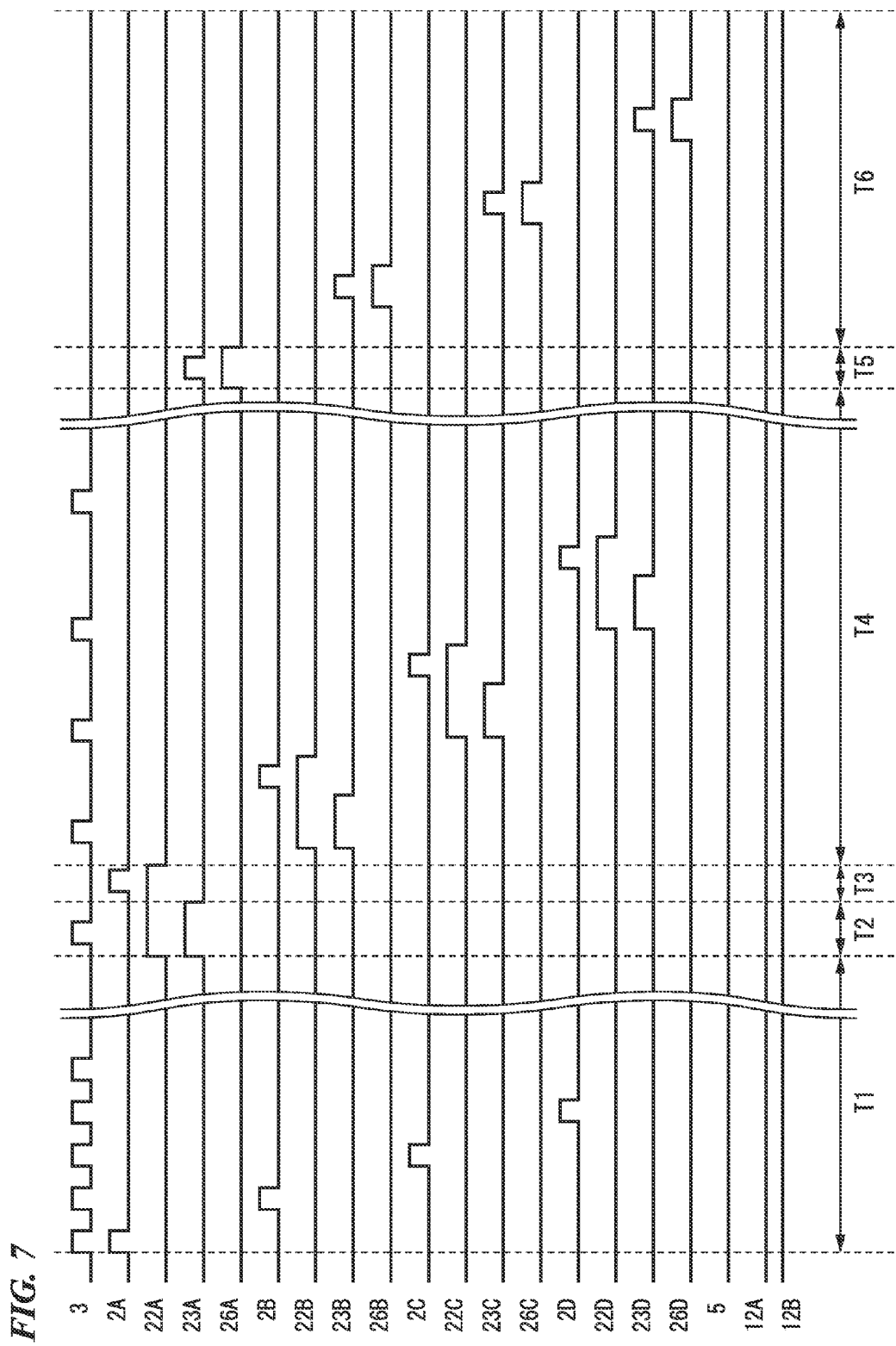
FIG. 7 is a timing chart illustrating operation of the unit pixel cell and the unit memory cell included in the image pickup unit included in the image pickup device according to the first embodiment of the present invention.

Hereinafter, operation of the unit pixel cell 31 and the unit memory cell 38 in a case where signals are read via both the first substrate 101 and the second substrate 102 (global shutter operation) is explained with reference to FIG. 7. In FIG. 7, control signals supplied from the vertical drive circuits 33A and 33B to the unit pixel cell 31 and the unit memory cell 38 are shown in association with reference numerals of the circuit elements supplied with the respective control signals.

In the global shutter operation, operation of reading signals to the vertical signal line 10A via the select transistor 5 is not performed. For this reason, a select pulse are not supplied from the vertical drive circuit 33A to the select transistor 5. Further, a voltage signal is not supplied from the vertical drive circuit 33A to the load transistor 12A. Additionally, a predetermined voltage is applied from the vertical drive circuit 33B to the load transistor 12B, and a drive current is supplied to the amplifier transistor 4.

[Operation in Period T1]

Firstly, a reset pulse supplied from the vertical drive circuit 33A to the reset transistor 3 changes from "L" (low) level to "H" (high) level, thereby turning on the reset transistor 3. At the same time, a transfer pulse supplied from the vertical drive circuit 33A to the transfer transistor 2A changes from "L" level to "H" level, thereby turning on the transfer transistor 2A. Thereby, the photoelectric conversion element 1A is reset.

Then, a reset pulse supplied from the vertical drive circuit 33A to the reset transistor 3 and a transfer pulse supplied from the vertical drive circuit 33A to the transfer transistor 2A change from "H" level to the "L" level, thereby turning off the reset transistor 3 and the transfer resistor 2A. Thereby, the resetting of the photoelectric element 1A ends, and then exposure of the photoelectric conversion element 1A (storing of the signal charge) starts. In a similar manner to the above, the photoelectric conversion elements 1B, 1C, and 1D are subsequently reset, and exposure of each photoelectric conversion element starts.

[Operation in Period T2]

Then, the reset pulse supplied from the vertical drive circuit 33B to the reset transistor 23A changes from "L" level to "H" level, thereby turning on the reset transistor 23A. Thereby, the analog memory 24A is reset. At the same time, a sample pulse supplied from the vertical drive circuit 33B to the sample transistor 22A changes from "L" level to "H" level, thereby turning on the sample transistor 22A. Thereby, the voltage of the other terminal of the clamp capacitor 21 is reset to the power voltage, and the sample transistor 22A starts to sample-hold the voltage of the other terminal of the clamp capacitor 21.

Then, the reset pulse supplied from the vertical drive circuit 33A to the reset transistor 3 changes from "L" level to "H" level, thereby turning on the reset transistor 3. Thereby, the charge retention unit FD is reset. Then, the reset pulse supplied from the vertical drive circuit 33A to the reset transistor 3 changes from "H" level to "L" level, thereby turning off the reset transistor 3. Thereby, the resetting of the charge retention unit FD ends. The timing of resetting the charge retention unit FD may be in the period of exposure. If the charge retention unit FD is reset in the timing immediately before the exposure period, however, it is possible to reduce more noises caused by leak current of the charge retention unit FD.

Then, the reset pulse supplied from the vertical drive circuit 33B to the reset transistor 23A changes from "H" level to "L" level, thereby turning off the reset transistor 23A. Thereby, the resetting of the analog memory 24A ends. At this time, the clamp capacitor 21 clamps the amplified signal (the amplified signal after the charge retention unit FD is reset) output from the amplified transistor 4.

[Operation in Period T3]

Firstly, the transfer pulse supplied from the vertical drive circuit 33A to the transfer transistor 2A changes from "L" level to "H" level, thereby turning on the transfer transistor 2A. Thereby, the signal charge stored in the photoelectric conversion element 1A is transferred to the charge retention unit FD via the transfer transistor 2A, and thus is stored in the charge retention unit FD. Thereby, the exposure of the photoelectric conversion element 1A (storing of the signal charge) ends. The period from the start of the exposure of the photoelectric conversion element 1A in the period T1 to the end of the exposure of the photoelectric conversion elements 1A in the period T3 is the exposure period (signal storing period). Then, the transfer pulse supplied from the vertical drive circuit 33A to the transfer transistor 2A changes from "H" level to "L" level, thereby turning off the transfer transistor 2A.

Then, the sample pulse supplied from the vertical drive circuit 33B to the sample transistor 22A changes from "H" level to "L" level, thereby turning off the sample transistor 22A. Thereby, the sample transistor 22A terminates sample-holding of the voltage of the other terminal of the clamp capacitor 21.

[Operation in Period T4]

The operations in the aforementioned periods T2 and T3 are operations of the unit pixel 37 including the photoelectric conversion element 1A and of the unit memory unit 39 including the analog memory 24A. In the period T4, similar operations to those in the periods T2 and T3 are performed with respect to another unit pixel 37 and another unit memory unit 39. In the case of FIG. 7, due to restriction on space of the drawing, the length of each exposure period for each photoelectric conversion element differs, but is preferably set to the same length.

Hereinafter, change in the voltage of the one terminal of the analog memory 24A is explained. Change in the one terminal of each of the other analog memories 24B, 24C, and 24D is similar. The change $\Delta Vamp1$ in the voltage of the other terminal of the amplifier transistor 4, which is caused by the signal charge being transferred from the photoelectric conversion element 1A to the charge retention unit FD, equals $\alpha1 \times \Delta Vfd$ where $\Delta Vfd$ denotes the change in the voltage of the one terminal of the charge retention unit FD which is caused by the signal charge being transferred from the photoelectric conversion element 1A to the charge retention unit FD after the resetting of the charge retention unit FD ends, and $\alpha1$ denotes a gain of the amplifier transistor 4.

Change $\Delta Vmem$ in the voltage of the one terminal of the analog memory 24A, which is caused by sample-holding of the sample transistor 22A after the signal charge is transferred from the photoelectric conversion element 1A to the charge retention unit FD equals $\alpha2 \times \Delta Vamp1$, that is, $\alpha1 \times \alpha2 \times \Delta Vfd$, where $\alpha2$ denotes the total gain of the analog memory 24A and the sample transistor 22A. The voltage of the one terminal of the analog memory 24A at the time when the resetting of the analog memory 24A ends is the power voltage VDD. For this reason, the voltage Vmem of the one terminal of the analog memory 24A sample-hold by the sample transistor 22A after the signal charge is transferred from the photoelectric conversion element 1A to the charge retention unit FD, is expressed as in the following equation (1). In equation (1), $\Delta Vmem<0$ and $\Delta Vfd<0$.

$$Vmem = VDD + \Delta Vmem \quad (1)$$
$$= VDD + \alpha1 \times \alpha2 \times \Delta Vfd$$

Additionally, $\alpha2$ is expressed as in the following equation (2). In equation (2), CL denotes a capacitance value of the clamp capacitor 21, and CSH denotes a capacitance value of the analog memory 24A. In order to further reduce the decrease in the gain, the capacitance CL of the clamp capacitor 21 is preferably larger than the capacitance CSH of the analog memory 24.

$$\alpha2 = \frac{CL}{CL + CSH} \quad (2)$$

[Operation in Period T5]

In period T5, signals based on the signal charge stored in the analog memories 24A, 24B, 24C, and 24D are sequentially read. Firstly, reading of a signal from the unit memory unit 39 including the analog memory 24A is performed. A select pulse supplied from the vertical drive circuit 33B to the select transistor 26A changes from "L" level to "H" level, thereby turning on the select transistor 26A. Thereby, a signal based on the voltage Vmem shown in equation (1) is output to the vertical signal line 10B via the select transistor 26A.

Then, the reset pulse supplied from the vertical drive circuit 33B to the reset transistor 23A changes from "L" level to "H" level, thereby turning on the reset transistor 23A. Thereby, the analog memory 24A is reset, and the signal based on the voltage of the one terminal of the analog memory 24A at the time of the resetting is output to the vertical signal line 10B via the select transistor 26A.

Then, the reset pulse supplied from the vertical drive circuit 33B to the reset transistor 23A changes from "H" level to "L" level, thereby turning off the reset transistor 23A. Then, the select pulse supplied from the vertical drive circuit 33B to the select transistor 26A changes from "H" level to "L" level, thereby turning off the select transistor 26A.

The column circuit unit 34B generates a difference signal by calculating the difference between the signal based on the voltage Vmem shown in equation (1) and the signal based on the voltage of the one terminal of the analog memory 24A at the time of the resetting of the analog memory 24A. This difference signal is a signal based on the voltage Vmem shown in equation (1) and the power voltage VDD, that is, the signal based on the difference $\Delta Vfd$ between the voltage of the one terminal of the charge retention unit FD immediately after the signal charge stored in the photoelectric conversion element 1A is transferred to the charge retention unit FD, and the voltage of the charge retention unit FD immediately after the one terminal of the charge retention unit FD is reset. Accordingly, a signal element based on the signal charge stored in the photoelectric conversion element 1A can be obtained while suppressing the noise element caused by resetting the analog memory 24A and the noise element caused by resetting the charge retention unit FD.

The signal output from the column circuit unit 34B is output from the output circuit 36B by the horizontal drive circuit 32B. Thus, the reading of the signal from the unit memory unit 39 including the analog memory 24A ends.

[Operation in Period T6]

Subsequently, operation similar to the operation in period T5 is performed with respect to each unit memory unit 39 including the analog memories 24B, 24C, and 24D.

In the normal global shutter operation, the charge retention unit FD must store the signal charge transferred from the photoelectric conversion element until the reading timing for each pixel. If noise occurs while the charge retention unit FD stores the signal charge, that noise is superimposed on the signal charge stored by the charge retention unit FD, thereby causing deterioration of signal quality (S/N).

Primary factors for the occurrence of noises in a period for the charge retention unit FD to store the signal charge (hereinafter referred to as a "retention period") are charge resulting from leak current of the charge retention unit FD (hereinafter referred to as leak charge) and charge resulting from the light entering a portion other than the photoelectric conversion element (hereinafter referred to as light charge). Noise charge Qn equals (qid+qpn)tc where qid and qpn denote the leak charge per unit time and the light charge per unit time, respectively.

The capacitance of the charge retention unit FD is denoted as Cfd. The capacitances of the analog memories 24A, 24B, 24C, and 24D are denoted as Cmem. A ratio of Cfd to Cmem, that is, (Cmem/Cfd), is denoted as A. As explained above, the gain of the amplifier transistor 4 is denoted as $\alpha1$. The total gain of the analog memories 24A, 24B, 24C, and 24D and the sample transistors 22A, 22B, 22C, and 22D is denoted as $\alpha2$.

The signal charge stored in the analog memories 24A, 24B, 24C, and 24D after the exposure period ends equals $A \times \alpha 1 \times \alpha 2 \times Qph$ where Qph denotes the signal charge generated by the photoelectric conversion elements 1A, 1B, 1C, and 1D during the exposure period.

The signals based on the signal charge transferred from the photoelectric conversion elements 1A, 1B, 1C, and 1D to the charge retention unit FD are sample-hold by the sample transistors 22A, 22B, 22C, and 22D and stored in the analog memories 24A, 24B, 24C, and 24D. Accordingly, the duration from the time the signal charge is transferred to the charge retention unit FD to the time the signal charge is stored in the analog memories 24A, 24B, 24C, and 24D is short. For this reason, the noises generated in the charge retention unit FD are negligible. If noise generated while the analog memories 24A, 24B, 24C, and 24D store signal charge is assumed to be the same Qn as the above, S/N equals $A \times \alpha 1 \times \alpha 2 \times Qph/Qn$.

On the other hand, in a case where the signal based on the signal charge stored in the charge retention unit FD is read to the vertical signal line 10A via the amplifier transistor 4 and the select transistor 5, S/N equals $Qph/Qn$. Accordingly, S/N in the case where the signal charge stored in the charge retention unit FD is stored in the analog memories 24A, 24B, 24C, and 24D and then read to the vertical line 10B equals $A \times \alpha 1 \times \alpha 2$ times S/N in the case where the signal charge stored in the charge retention unit FD is read to the vertical signal line 10A. The capacitance values of the analog memories 24A, 24B, 24C, and 24D are set so that $A \times \alpha 1 \times \alpha 2$ exceeds 1 (for example, the capacitance values of the analog memories 24A, 24B, 24C, and 24D are set to be much greater than the capacitance value of the charge retention unit FD), thereby enabling a reduction in deterioration of signal quality.

Figure 8:
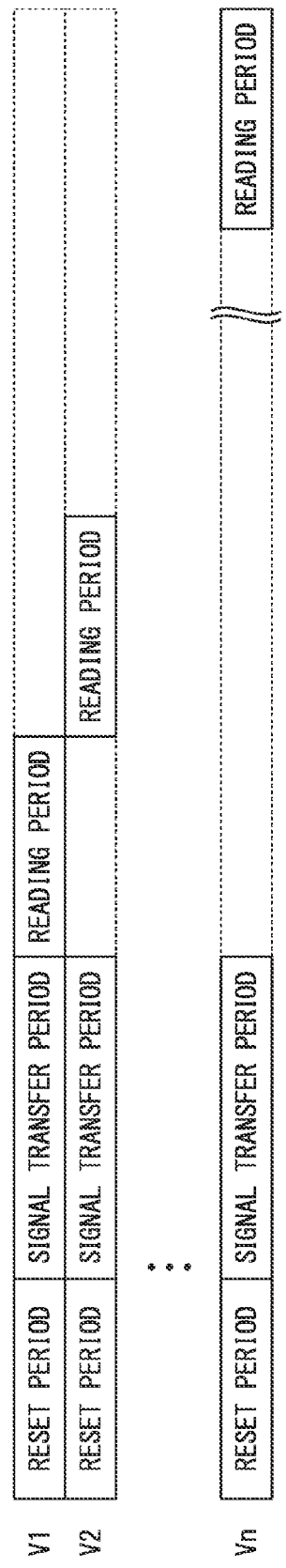
FIG. 8 is a timing chart illustrating operation of the unit pixel cell and the unit memory cell included in the image pickup unit included in the image pickup device according to the first embodiment of the present invention.

In the global shutter operation of the first embodiment, the unit pixel cell 31 and the unit memory cell 38, which have the same position in the vertical direction (hereinafter referred to as the vertical position), have the same operational timing. However, the unit pixel cell 31 and the unit memory cell 38, which have different vertical positions, have different operational timings. FIG. 8 schematically illustrates the operational timings of the unit pixel cell 31 and the unit memory cell 38 which have different vertical positions (V1, V2, . . . , Vn). In FIG. 8, positions in the vertical direction denote the vertical positions in the arrangement of the unit pixel cell 31 and the unit memory cell 38, and positions in the horizontal direction denote the time positions.

The reset period corresponds to the period T1 shown in FIG. 7. The signal transfer period corresponds to the periods T2, T3, and T4 shown in FIG. 7. The reading period corresponds to the periods T5 and T6 shown in FIG. 7. As shown in FIG. 8, the unit pixel cell 31 and the unit memory cell 38, which have different vertical positions, have the same reset period and the same signal transfer period, but have different reading periods. In the aforementioned global shutter operation, the exposure timing differs for each unit pixel element 37 included in the same unit pixel cell 31 and for each unit memory unit 39 included in the same unit memory cell 38. However, synchronization of the exposure can be achieved for the entire unit pixel cell 31 and for the entire unit memory cell 38.

Figure 9:
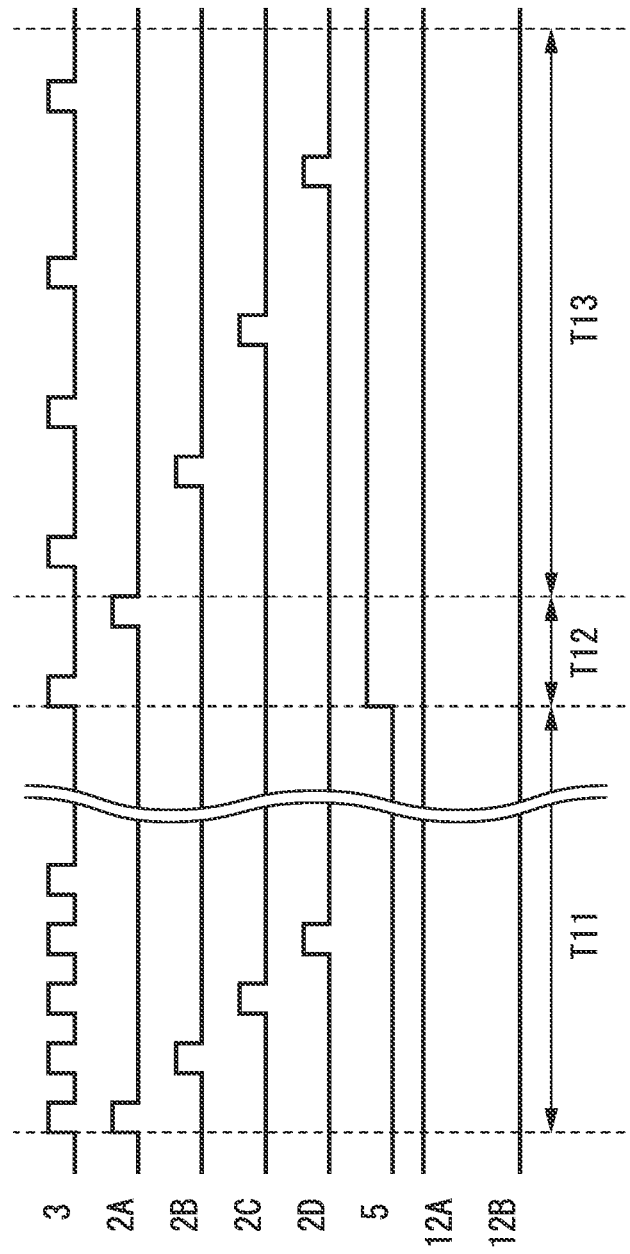
FIG. 9 is a timing chart illustrating operation of the unit pixel cell included in the image pickup unit included in the image pickup device according to the first embodiment of the present invention.

Hereinafter, operation of the unit pixel cell 31 in a case where a signal is read only via the first substrate 101 (rolling shutter operation) is explained with reference to FIG. 9. FIG. 9 shows control signals supplied from the vertical drive circuits 33A and 33B to the unit pixel cell 31 and the unit memory cell 38, in association with reference numerals of the circuit elements supplied with the respective control signals.

In the rolling shutter operation, the operation, in which signals are transferred from the first substrate 101 to the second substrate 102 and then are read to the vertical signal line 10B via the select transistors 26A, 26B, 26C, and 26D, is not performed. For this reason, select pulses (not shown) are not supplied from the vertical drive circuit 33B to the select transistors 26A, 26B, 26C, and 26D. Further, voltage signals are not supplied from the vertical drive circuit 33B to the load transistor 12B. Additionally, the predetermined voltage is applied from the vertical drive circuit 33A to the load transistor 12A, thereby supplying a drive current to the amplifier transistor 4.

[Operation in Period T11]

Firstly, the reset pulse supplied from the vertical drive circuit 33A to the rest transistor 3 changes from "L" level to "H" level, thereby turning on the reset transistor 3. At the same time, the transfer pulse supplied from the vertical drive circuit 33A to the transfer transistor 2A changes from "L" level to "H" level, thereby turning on the transfer transistor 2A. Thereby, the photoelectric conversion element 1A is reset.

Then, the reset pulse supplied from the vertical drive circuit 33A to the rest transistor 3, and the transfer pulse supplied from the vertical drive circuit 33A to the transfer transistor 2A change from "H" level to "L" level, thereby turning off the reset transistor 3 and the transfer transistor 2A. Thereby, the resetting of the photoelectric conversion element 1A ends, and exposure of the photoelectric conversion element 1A (storing of signal charge) starts. In a similar manner to the above, the photoelectric conversion elements 1B, 1C, and 1D are subsequently reset, and exposure of each photoelectric conversion element starts.

[Operation in Period T12]

In period T12, signal charge stored in the photoelectric conversion elements 1A, 1B, 1C, and 1D are transferred to the charge retention unit FD, and signals based on the signal charge stored in the charge retention unit FD are subsequently read for each row. Firstly, reading of a signal from the unit pixel 37 including the photoelectric conversion element 1A is performed. The select pulse supplied from the vertical drive circuit 33A to the select transistor 5 changes from "L" level to "H" level, thereby turning on the select transistor 5. At the same time, the reset pulse supplied from the vertical drive circuit 33A to the rest transistor 3 changes from "L" level to "H" level, thereby turning on the reset transistor 3. Thereby, the charge retention unit FD is reset, and the signal based on the voltage of the charge retention unit FD at the time of the resetting is output to the vertical signal line 10A via the select transistor 5. Then, the reset pulse supplied from the vertical drive circuit 33A to the rest transistor 3 changes from "H" level to "L" level, thereby turning off the reset transistor 3.

Then, the transfer pulse supplied from the vertical drive circuit 33A to the transfer transistor 2A changes from "L" level to "H" level, thereby turning on the transfer transistor 2A. Thereby, the signal charge stored in the photoelectric conversion element 1A is transferred to the charge retention unit FD via the transfer transistor 2A, and thus is stored in the charge retention unit FD. Thereby, the exposure of the photoelectric conversion element 1A (storing of the signal charge) ends. A period from the start of the exposure of the photoelectric conversion element 1A in the period T11 to the end of the exposure of the photoelectric conversion element 1A in the period T12 is an exposure period (signal storing period). Since the select transistor 5 is on, the signal based on the voltage of the charge retention unit FD is output to the vertical signal line 10A via the select transistor 5. Then, the transfer pulse supplied from the vertical drive circuit 33A to the transfer transistor 2A changes from "H" level to "L" level, thereby turning off the transfer transistor 2A.

The column circuit unit 34A generates a difference signal by calculating the difference between the signal based on the voltage of the charge retention unit FD immediately after the signal charge is transferred from the photoelectric conversion element 1A to the charge retention unit FD and the signal based on the voltage of the charge retention unit FD at the time when the charge retention unit FD is reset. Accordingly, the signal element based on the signal charge stored in the photoelectric conversion element 1A can be obtained while suppressing elements of noises caused by resetting the charge retention unit FD.

The signal output from the column circuit unit 34A is output from the output circuit 36A by the horizontal drive circuit 32A. Thus, the reading of signals from the unit pixel 37 including the photoelectric conversion element 1A ends.

[Operation in Period T13]

Subsequently, operation similar to the operation in the period T12 is performed with respect to each unit pixel 37 including the photoelectric conversion elements 1B, 1C, and 1D.

Figure 10:
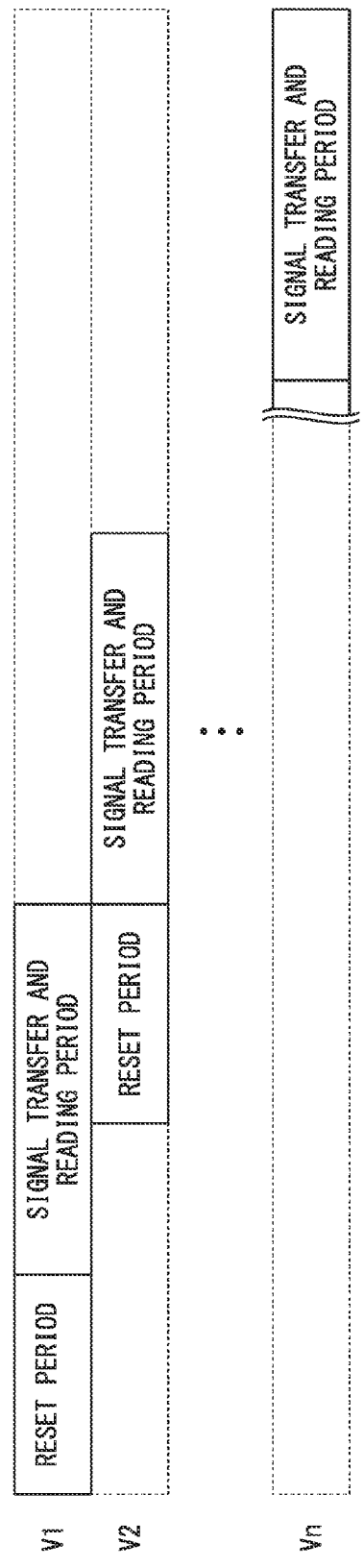
FIG. 10 is a timing chart illustrating operation of the unit pixel cell included in the image pickup unit included in the image pickup device according to the first embodiment of the present invention.

In the rolling shutter operation of the first embodiment, the unit pixel cells 31 having the same vertical position have the same operational timing. However, the unit pixel cells 31 having different vertical positions have different operational timings. FIG. 10 schematically illustrates the operational timings of the unit pixel cells 31 having different vertical positions (V1, V2, ..., Vn). In FIG. 10, positions in the vertical direction denote the vertical positions in the arrangement of the unit pixel cells 31, and positions in the horizontal direction denote the time positions.

The reset period corresponds to the period T11 shown in FIG. 9. The signal transfer and reading period corresponds to the periods T12 and T13 shown in FIG. 10. As shown in FIG. 10, the unit pixel cells 31 having different vertical positions have different signal transfer and reading periods so as not to overlap each other. In the aforementioned rolling shutter operation, the exposure timing differs for each of the unit pixel cells 31 having the different vertical positions. However, synchronization of the exposure can be achieved if a mechanical shutter (not shown) is used.

Figure 11:
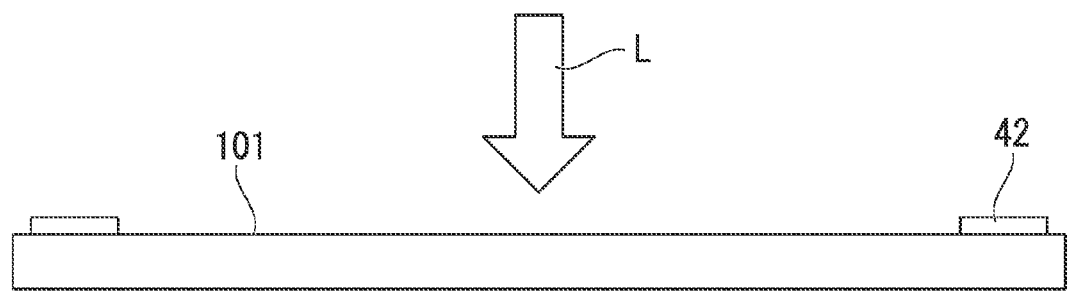
FIG. 11 is a cross-sectional view illustrating the first substrate included in the image pickup device according to the first embodiment of the present invention.

In the rolling shutter operation of the first embodiment, only the first substrate 101 operates. Therefore, the first substrate 101 alone in the state of not being coupled to the second substrate 102 as shown in FIG. 11 can be used.

As explained above, according to the first embodiment, circuit elements required for reading signals by multiple reading modes are arranged on multiple substrates. Circuit elements required for reading signals by at least one reading mode are arranged on one of the multiple substrates. Thereby, it is possible to read signals by multiple reading modes from pixels of the solid-state image pickup device including multiple substrates, and to read signals using only one substrate by at least one of the reading modes.

Additionally, if the first substrate 101 alone is used, it is possible to achieve a solid-state image pickup device compatible with the rolling shutter operation and a camera using that device. Further, if the second substrate 102 is placed over the first substrate 101 that is manufactured for the rolling shutter operation to constitute a solid-state image pickup device, it is possible to achieve a solid-state image pickup device compatible with the global shutter operation and a camera using that device.

Moreover, the analog memories 24A, 24B, 24C, and 24D are provided, thereby reducing deterioration of signal quality. Particularly, the capacitance values of the analog memories 24A, 24B, 24C, and 24D are set to be greater than the capacitance value of the charge retention unit FD (for example, the capacitance values of the analog memories 24A, 24B, 24C, and 24D are set to be five times or more the capacitance value of the charge retention unit FD). Thereby, the signal charge stored in the analog memories 24A, 24B, 24C, and 24D is larger than the signal charge stored in the charge retention unit FD, thereby reducing the effect of signal deterioration due to leak current of the analog memories 24A, 24B, 24C, and 24D.

Additionally, the clamp capacitor 21 and the sample transistors 22A, 22B, 22C, and 22D are provided, thereby reducing noises generated in the first substrate 101. The noises generated in the first substrate 101 include: noise (such as reset noise) generated in the input unit of the amplifier transistor 4, which results from operation of a circuit coupled to the amplifier transistor 4 (such as the reset transistor 3); noise (such as noise resulting from variation in circuit threshold of the amplifier transistor 4) resulting from the operational property of the amplifier transistor 4; and the like.

Further, the signal at the time of resetting the analog memories 24A, 24B, 24C, and 24D, and the signal according to the change in the outputs of the amplifier transistor 4 which is caused by transferring the signal charge from the photoelectric conversion elements 1A, 1B, 1C, and 1D to the charge retention unit FD, are output by time division. Then, the process of calculating the difference between those signals is performed, thereby reducing noises generated in the second substrate 102. The noises generated in the second substrate 102 include noise (such as reset noise) generated in the input units of the amplifier transistors 25A, 25B, 25C, and 25D, which results from operations of circuits coupled to the amplifier transistors 25A, 25B, 25C, and 25D (such as the reset transistors 23A, 23B, 23C, and 23D), and the like.

Second Embodiment

Figure 12:
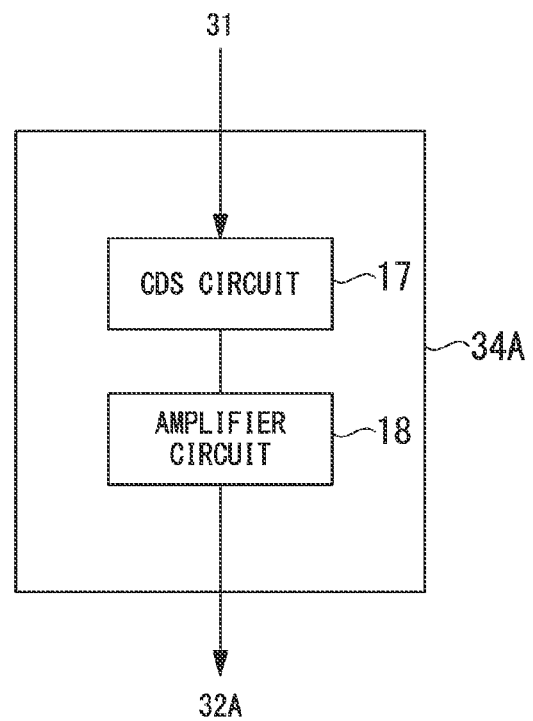
FIG. 12 is a block diagram illustrating a column circuit unit included in the image pickup device according to a second embodiment of the present invention.

Hereinafter, a second embodiment of the present invention is explained. The difference from the first embodiment is in that an AD converter is not included in the column circuit unit 34A of the first substrate 101 and that the output of the output circuit 36A is not a digital output, but an analog output. The other configurations are similar to those of the first embodiment. FIG. 12 illustrates a configuration of the column circuit 34A of the second embodiment. The column circuit unit 34A includes: a CDS circuit 17 that reduces noises by calculating the difference between two types of signals; and an amplifier circuit 18 that amplifies the signals from which the noises are reduced.

Generally, yield of semiconductor devices is lowered as the chip area increases. In the second embodiment, the yield of MOS solid-state image pickup devices affecting image quality greatly affects the costs thereof. For this reason, an AD converter that is a factor for an increase in chip area is removed, thereby further reducing the costs. Additionally, in a case where the global shutter operation is performed using the first substrate 101 and the second substrate 102, the AD converter included in the second substrate 102 can be used.

According to the second embodiment, a reduction in costs as well as the effect explained in the first embodiment can be achieved. In the second embodiment, although so called a column-parallel mode is used for the AD converter in the second substrate 102, a pipeline mode or another mode may be used.

Third Embodiment

Figure 13:
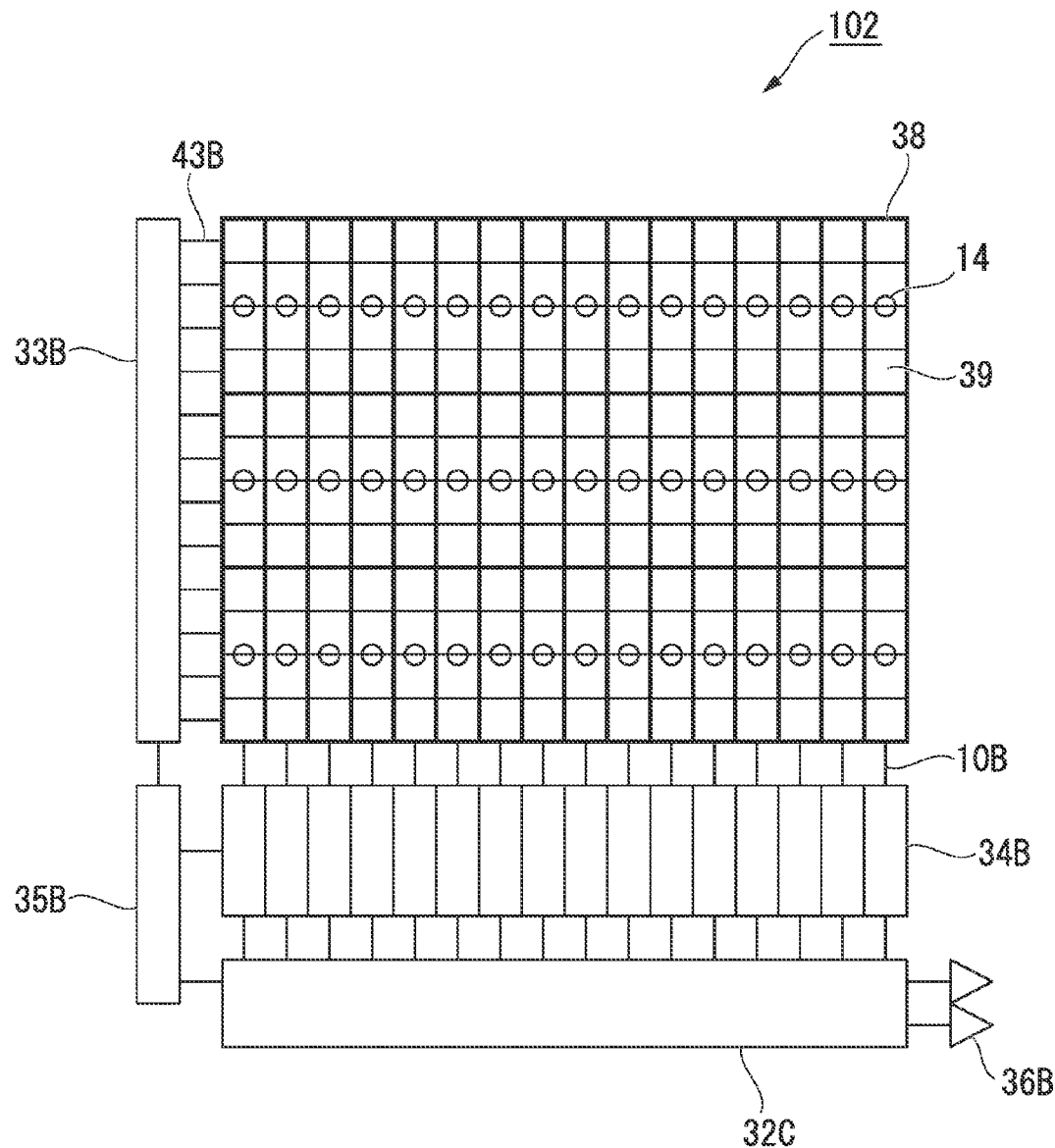
FIG. 13 is a block diagram illustrating a second substrate included in the image pickup device according to a third embodiment of the present invention.
Figure 14:
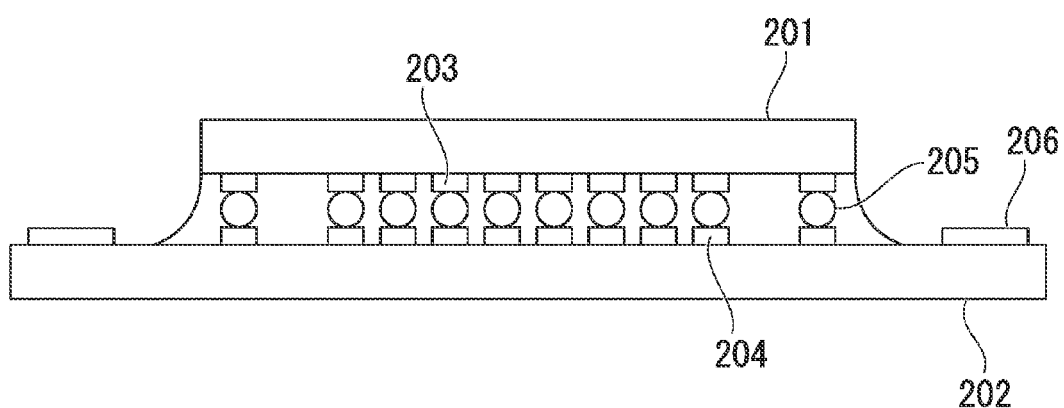
FIG. 14 is a cross-sectional view illustrating a configuration of a solid-state image pickup device of related art.
Figure 15:
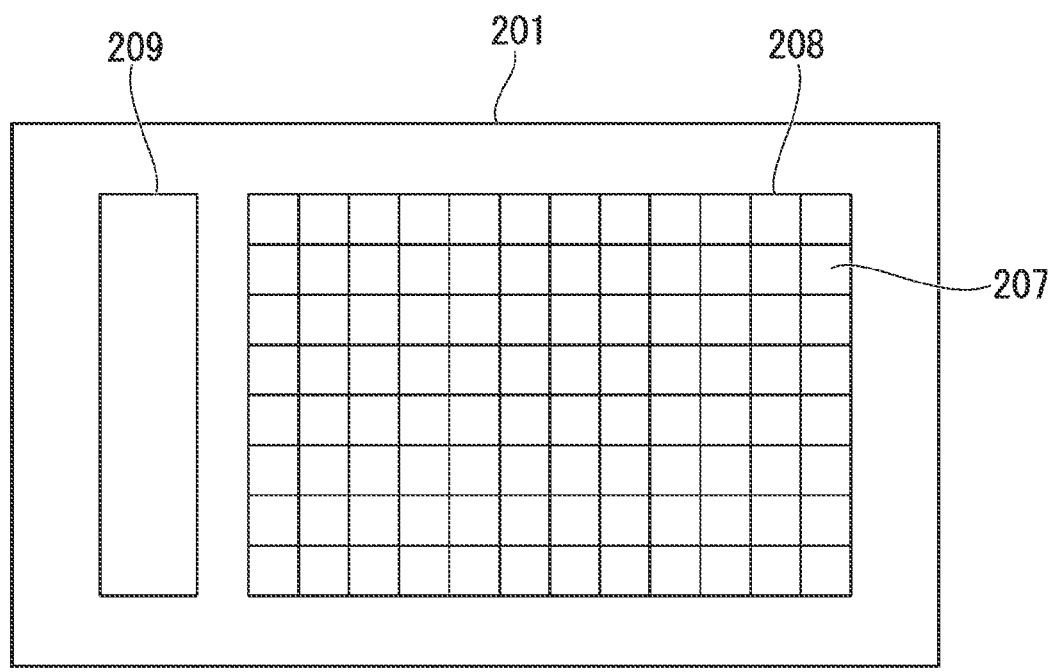
FIG. 15 is a configuration diagram illustrating a configuration of a first substrate included in the solid-state image pickup device of the related art.
Figure 16:
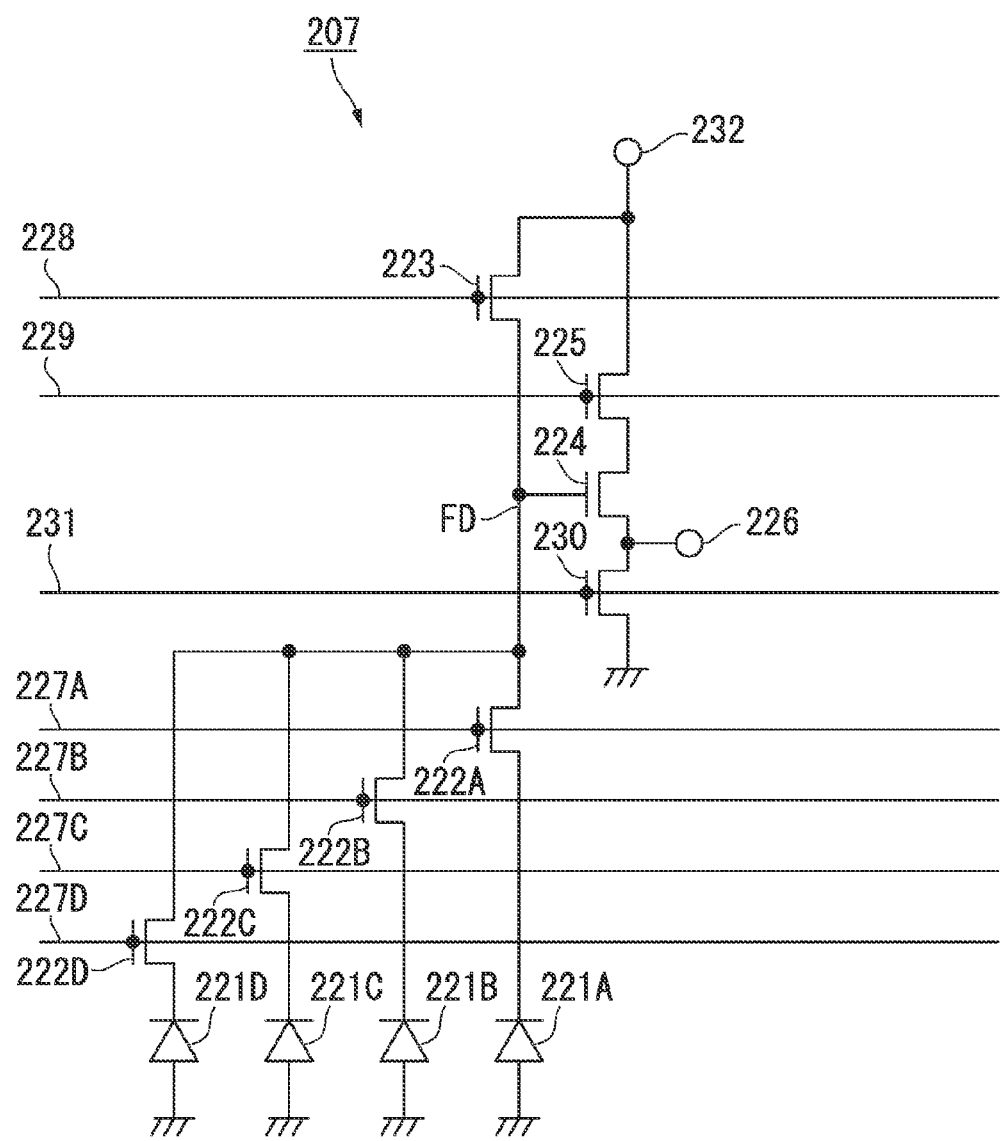
FIG. 16 is a circuit diagram illustrating a circuit configuration of pixel cells of the first substrate included in the solid-state image pickup device of the related art.
Figure 17:
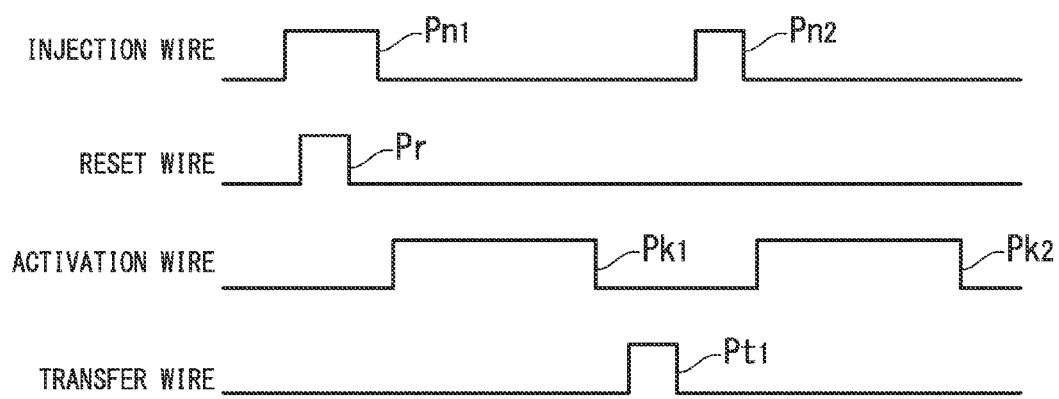
FIG. 17 is a timing chart illustrating operation of pixels included in the solid-state image pickup device of the related art.

Hereinafter, a third embodiment of the present invention is explained. FIG. 13 illustrates a configuration of the second substrate 102 according to the third embodiment. The difference from the first embodiment is in that multiple output circuits 36 are provided and that a horizontal drive circuit 32C compatible with the multiple output circuits 36B is provided. Other configurations are similar to those of the first embodiment.

The horizontal drive circuit 32C outputs, in parallel, the signals processed by the column circuit units 34B from the output circuits 36B. Thereby, horizontal reading can be performed faster compared to in the first embodiment. Accordingly, it is possible to increase a frame rate for the entire image pickup device, thereby making the image pickup device compatible with high-speed continuous shooting and the like.

According to the third embodiment, a solid-state image pickup device compatible with high-speed continuous shooting, as well as the effect explained in the first embodiment, can be achieved. Further, in a case where a solid-state image pickup device is implemented by the first substrate 101 alone, there is no increase in cost due to an increase in the chip area.

A first reading circuit according to the present invention corresponds to, for example, the vertical signal line 10A and the horizontal drive circuit 32A which perform reading by the rolling shutter mode. A second reading circuit according to the present invention corresponds to, for example, the vertical signal line 10B and the horizontal drive circuit 32B which perform reading by the global shutter mode. A first circuit set according to the present invention corresponds to circuit elements that enable reading by the global shutter mode, such as: the transfer transistors 2A, 2B, 2C, and 2D; the reset transistor 3; the amplifier transistor 4; the clamp capacitor 21; the sample transistors 22A, 22B, 22C, and 22D; the reset transistors 23A, 23B, 23C, and 23D; the analog memories 24A, 24B, 24C, and 24D; the amplifier transistors 25A, 25B, 25C, and 25D; and the select transistors 26A, 26B, 26C, and 26D. A second circuit set according to the present invention corresponds to circuit elements that enable reading by the rolling shutter mode, such as: the transfer transistors 2A, 2B, 2C, and 2D; the reset transistor 3; the amplifier transistor 4; and the select transistor 5.

A signal storing circuit and a capacitor according to the present invention correspond to, for example, the analog memories 24A, 24B, 24C, and 23D. A selecting circuit and a switch according to the present invention correspond to, for example, the select transistor 5. A first output signal line according to the present invention corresponds to, for example, the vertical signal line 10A. A second output signal line according to the present invention corresponds to, for example, the vertical signal line 10B. A reset circuit according to the present invention corresponds to, for example, the transfer transistors 2A, 2B, 2C, and 2D, and the reset transistor 3. A reset control circuit, a reading control circuit, and a load control circuit according to the present invention correspond to, for example, the vertical drive circuit 33A. An amplifier circuit according to the present invention corresponds to, for example, the amplifier transistor 4. A noise reduction circuit according to the present invention corresponds to, for example, the clamp capacitor 21, and the sample transistors 22A, 22B, 22C, and 22D.

A first reset circuit according to the present invention corresponds to, for example, the transfer transistors 2A, 2B, 2C, and 2D, and the reset transistor 3. A second reset circuit according to the present invention corresponds to, for example, the reset transistor 3. A second amplifier circuit according to the present invention corresponds to, for example, the amplifier transistors 25A, 25B, 25C, and 25D. A third reset circuit according to the present invention corresponds to, for example, the reset transistors 23A, 23B, 23C, and 23D.

A first load transistor according to the present invention corresponds to, for example, the load transistor 12A. A second load transistor according to the present invention corresponds to, for example, the load transistor 12B. An AD converting circuit according to the present invention corresponds to, for example, the column circuit unit 34B.

Although the embodiments of the present invention have been explained above with reference to the drawings, specific configurations are not limited to the above embodiments, and various design modifications and the like may be made without departing from the scope of the present invention. Although the configuration of the solid-state image pickup device including two substrates coupled by couplers has been shown in the above embodiments, three or more substrates may be coupled by couplers. In a case of a solid-state image pickup device including three or more substrates coupled by couplers, two of the three or more substrates correspond to the first substrate and the second substrate.

A computer product for realizing arbitrary combinations of each constituent element and each operational process explained above is also effective as an embodiment of the present invention. Here, the "computer product" includes: a recording medium storing a program code (such as DVD mediums, hard disk mediums, and memory mediums); a device storing a program code (such as computer); a system storing a program code (such as a system including a server and a client terminal); and the like. In this case, each constituent element or each operational process is implemented by a module, and a program code including such modules is stored in the computer product.

A program for realizing arbitrary combinations of each constituent element and each operational process explained above is also effective as an embodiment of the present invention. Such a program may be recorded in a computer-readable recording medium, and a computer may read and execute the program recorded in this recording medium to achieve the object of the present invention.

Here, the "computer" also includes a homepage-providing environment (or a display environment) if a WWW system is used. Additionally, the "computer-readable recording medium" refers to a portable medium such as a flexible disk, a magnetic optical disc, a ROM, and a CD-ROM, or a storage device such as a hard disk embedded in the computer system. Further, the "computer-readable recording medium" also includes a recording medium that stores a program for a certain period of time, such as a volatile memory (RAM) in a computer system including a server and a client in a case where the program is transmitted via a network such as the Internet or a communication line such as a telephone line.

Additionally, the aforementioned program may be transferred from the computer storing that program in the storage device or the like, to another computer via a transmission medium or "transmission waves" in the transmission medium. Here, the "transmission medium" transferring the program means a medium having a function of transferring information, which includes a network such as the Internet or a telecommunication line (communication line) such as a telephone line. Further, the program may be a program for realizing part of the aforementioned functions or may be a program capable of realizing the aforementioned functions in combination with a program already recorded in the computer system, that is, a difference file (difference program).

Although the embodiments of the present invention have been explained above, various substituted, modified, and equivalent elements or processes may be used as the aforementioned constituent elements and operational processes. In the above embodiments disclosed in the present specification, one component may be replaced with multiple components, or multiple components may be replaced with one component, in order to execute one or more functions. Such replacement is within the scope of the present invention unless such replacement does not adequately work to achieve the object of the present invention. Accordingly, the present invention is not determined with reference to the above explanations, but should be determined by the claims. Additionally, the entire scope of equivalents is included in the present invention. In the claims, the number of each constituent element is one or more unless otherwise mentioned expressly. Unless the expression of "a means for . . . " is expressly used in the claims, the claims may not be interpreted as including a means-plus-function limitation.

Terms in the present specification are used only for explaining particular embodiments, not to limit the present invention. In the present specification, a term in singular form may not exclude interpretation of the same term in plural form unless such exclusion is expressly mentioned in a context.

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to a device equipped with the present invention.

The term "configured" is used to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

In addition, while not specifically claimed in the claim section, the application reserves the right to include in the claim section at any appropriate time the following devices and computer program products.

A solid-state image pickup device according to one embodiment of the present invention includes, but is not limited to: a plurality of substrates on which circuit elements constituting a pixel are arranged, the plurality of substrates being electrically coupled to one another; a photoelectric conversion means included in the pixel; a reading means configured to read from the pixel, a signal based on a signal generated by the photoelectric conversion means; and first to n-th circuit sets each including a circuit element configured to read a signal by a corresponding one of first to n-th reading modes. n is an integer equal to or greater than two. The circuit elements arranged on one of the plurality of substrates is used to complete operations from generation of the signal by the photoelectric conversion means to reading of the signal by at least one of the first to n-th reading modes. The photoelectric conversion means, the reading means, and at least one of the first to n-th circuit sets which corresponds to the at least one of the first to n-th reading modes, are arranged on the one of the plurality of substrates.

An image pickup device according to another embodiment of the present invention includes, but is not limited to: a plurality of substrates on which circuit elements constituting a pixel are arranged, the plurality of substrates being electrically coupled to one another; a photoelectric conversion means included in the pixel; a reading means configured to read from the pixel, a signal based on a signal generated by the photoelectric conversion means; and first to n-th circuit sets each including a circuit element configured to read a signal by a corresponding one of first to n-th reading modes. n is an integer equal to or greater than two.

the circuit elements arranged on one of the plurality of substrates is used to complete operations from generation of the signal by the photoelectric conversion means to reading of the signal by at least one of the first to n-th reading modes. The photoelectric conversion means, the reading means, and at least one of the first to n-th circuit sets which corresponds to the at least one of the first to n-th reading modes, are arranged on the one of the plurality of substrates.

A computer program product storing a program code that causes a computer to execute: reading, by at least one of a first reading mode and a second reading mode, a signal from a pixel of a solid-state image pickup device, the solid-state image pickup device comprising first and second substrates on which circuit elements constituting a pixel are arranged, and the first and second substrates being electrically coupled to each other. Reading the signal by the first reading mode includes, but is not limited to: generating a signal by a photoelectric conversion element on the first substrate, the photoelectric conversion element being included in the pixel; outputting the signal generated by the photoelectric conversion element from an output terminal on the first substrate, the output terminal being included in the pixel and coupled to the photoelectric conversion element; and outputting the signal output from the output terminal to a first output signal line on the first substrate, the first output signal line being coupled to the output terminal. Reading the signal by the second reading mode includes, but is not limited to: generating a signal by the photoelectric conversion element; storing the signal generated by the photoelectric conversion element into a capacitor on the second substrate via the output terminal and an input terminal on the second substrate, the capacitor being coupled to the input terminal, and the input terminal being coupled to the output terminal; and outputting the signal stored in the capacitor to a second output signal line on the second substrate, the second output signal line being coupled to the capacitor.

What is claimed is:

1. A solid-state image pickup device comprising:
a plurality of substrates on which circuit elements constituting a pixel are arranged, the plurality of substrates being electrically coupled to one another;
a photoelectric conversion element included in the pixel;
a reading circuit configured to read from the pixel, a signal based on a signal generated by the photoelectric conversion element;
first to n-th circuit sets each comprising a circuit element configured to read a signal by a corresponding one of first to n-th reading modes; and
a control circuit configured to control the circuit elements arranged on one of the plurality of substrates so as to solely complete operations from generation of the signal by the photoelectric conversion element to reading of the signal outward the solid-state image pickup device, in at least one of the first to n-th reading modes, wherein
n is an integer equal to or greater than two, and
the photoelectric conversion element, the reading circuit, and at least one of the first to n-th circuit sets which corresponds to the at least one of the first to n-th reading modes, are arranged on the one of the plurality of substrates.

2. The solid-state image pickup device according to claim 1, wherein the plurality of substrates comprises a first substrate and a second substrate.

3. The solid-state image pickup device according to claim 2, wherein n is two,
the circuit elements arranged on the first substrate is used to complete operations from generation of the signal by the photoelectric conversion element to reading of the signal by one of the first and second reading modes, and
the photoelectric conversion element, the reading circuit, and one of the first and second circuit sets which corresponds to the one of the first and second reading modes, are arranged on the first substrate.

4. The solid-state image pickup device according to claim 3, wherein the first reading mode is a global shutter mode,
the second reading mode is a rolling shutter mode,
the first circuit set comprises a circuit element configured to read a signal by the global shutter mode, and
the second circuit set comprises a circuit element configured to read a signal by the rolling shutter mode.

5. The solid-state image pickup device according to claim 4, wherein the circuit elements arranged on the first substrate are used to complete operations from generation of the signal by the photoelectric conversion element to reading of the signal by the rolling shutter mode, and
the photoelectric conversion element, the reading circuit, and the second circuit set are arranged on the first substrate.

6. The solid-state image pickup device according to claim 5, wherein the first substrate and the second substrate are used to complete operations from generation of the signal by the photoelectric conversion element to reading of the signal by the global shutter mode, and
the reading circuit and the first circuit set are arranged on each of the first substrate and the second substrate.

7. The solid-state image pickup device according to claim 6, wherein the first circuit set comprises a signal storing circuit on the second substrate, the signal storing circuit being configured to store the signal generated by the photoelectric conversion element.

8. The solid-state image pickup device according to claim 7, further comprising:
a plurality of couplers electrically coupling the plurality of substrates,
wherein the signal storing unit is configured to store a signal supplied from the first substrate via the plurality of couplers, and the reading circuit is configured to read the signal stored in the signal storing unit.

9. The solid-state image pickup device according to claim 6, wherein the reading circuit comprises:
a first reading circuit on the first substrate, the first reading circuit being configured to read a signal by the rolling shutter mode; and
a second reading circuit on the second substrate, the second reading circuit being configured to read a signal by the global shutter mode.

10. The solid-state image pickup device according to claim 9, further comprising:
a selecting circuit on the first substrate, the selecting circuit being configured to select from the first reading circuit and the second reading circuit, the reading circuit to be used for reading the signal based on the signal generated by the photoelectric conversion element.

11. The solid-state image pickup device according to claim 10, wherein the solid-state image pickup device is configured to operate by switching between a first operation mode and a second operation mode,
in a case where the solid-state image pickup device operates in the first operation mode, the selecting circuit is configured to select the first reading circuit, and
in a case where the solid-state image pickup device operates in the second operation mode, the selecting circuit is configured to select the second reading circuit.

12. The solid-state image pickup device according to claim 10, wherein the first reading circuit is coupled to the pixel,
the first reading circuit comprises a first output signal line on the first substrate,
the second reading circuit is coupled to the pixel, and
the second reading circuit comprises a second output signal line on the second substrate.

13. The solid-state image pickup device according to claim 1, further comprising:
a plurality of pixels grouped into a plurality of groups, each of the plurality of pixels comprising the photoelectric conversion element;
a reset circuit configured to reset the photoelectric conversion element;
a reset control circuit included in the control circuit, configured to collectively select the plurality of groups, and control the reset circuit to sequentially reset the photoelectric conversion element belonging to each of the plurality of groups selected.

14. The solid-state image pickup device according to claim 7, further comprising:
an amplifier circuit configured to amplify the signal generated by the photoelectric conversion element and output an amplified signal, wherein the signal storing unit is configured to store the amplified signal output from the amplifier circuit.

15. The solid-state image pickup device according to claim 14, further comprising:
a noise reduction circuit configured to reduce noise included in the amplified signal output from the amplifier circuit,
wherein the signal storing unit is configured to store the amplified signal from which the noise is reduced by the noise reduction circuit.

16. The solid-state image pickup device according to claim 15, wherein the amplifier circuit comprises an amplifier transistor having a gate, a source, and a drain,
the amplifier transistor is configured to: receive from the gate, the signal generated by the photoelectric conversion element; amplify the signal received from the gate; and output the amplified signal from one of the source and the drain.

17. The solid-state image pickup device according to claim 16, wherein the noise reduction circuit comprises:
a clamp capacitor configured to clamp the amplified signal output from the amplifier transistor; and
a transistor having a source and a drain, the transistor being configured to:
receive from one of the source and the drain, a signal based on the amplified signal clamped by the clamp capacitor;
sample-hold the signal received from the one of the source and the drain;
and store the signal sample-hold in the signal storing circuit.

18. The solid-state image pickup device according to claim 17, further comprising:
a plurality of couplers electrically coupling the plurality of substrates, the plurality of couplers being arranged on a path electrically coupling the amplifier transistor to the clamp capacitor.

19. The solid-state image pickup device according to claim 1, further comprising:
a plurality of couplers electrically coupling the plurality of substrates, the plurality of couplers comprising a plurality of bumps.

20. The solid-state image pickup device according to claim 1, further comprising:
a plurality of couplers electrically coupling the plurality of substrates, the plurality of couplers comprising:
a first electrode on a surface of the first substrate; and
a second electrode on a surface of the second substrate, the second electrode being attached onto the first electrode.

21. The solid-state image pickup device according to claim 2, wherein the second substrate is coupled to a surface of the first substrate, which opposes another surface of the first substrate to be irradiated with a light entering the photoelectric conversion element.

22. The solid-state image pickup device according to claim 14, further comprising:
a first reset circuit configured to reset the photoelectric conversion element;
a second reset circuit configured to reset an input unit of the amplifier circuit;
a transfer circuit configured to transfer the signal generated by the photoelectric conversion element to the input unit of the amplifier circuit;
a second amplifier circuit configured to amplify the amplified signal stored in the signal storing circuit and output a second amplified signal; and
a third reset circuit configured to reset an input unit of the second amplifier circuit.

23. The solid-state image pickup device according to claim 9,
wherein the control circuit configured to, in a case where the first reading circuit reads signals by the rolling shutter mode, store in the signal storing circuit, the signal generated by the photoelectric conversion element for every row or every plural rows in arrangement of pixels, and sequentially read the signal stored.

24. The solid-state image pickup device according to claim 9, further comprising:
a plurality of pixels grouped into a plurality of groups each including pixels in a single row or plural rows in arrangement of the plurality of pixels, each of the plurality of pixels comprising the photoelectric conversion element; and
a reading control circuit included in the control circuit, configured to, in a case where the second reading circuit reads the signal by the global shutter mode: correctively selects the plurality of groups;
sequentially store in the signal storing circuit, the signal generated by the photoelectric conversion element belonging to each of the plurality of groups selected;
sequentially select one of the plurality of groups; and
perform control to sequentially read the signal stored in the signal storing circuit corresponding to the pixels belonging to the one of the plurality of groups.

25. The solid-state image pickup device according to claim 14, further comprising:
a first load transistor on the first substrate, the first load transistor being used as a load for the amplifier circuit;
a second load transistor on the second substrate, the second load transistor being used as a load for the amplifier circuit; and
a load control circuit included in the control circuit, configured to cause the first load transistor to operate in a case where reading by the rolling shutter mode is performed, and cause the second load transistor to operate in a case where reading by the global shutter mode is performed.

26. The solid-state image pickup device according to claim 9, wherein the first reading circuit is configured to perform reading by the rolling shutter mode in a case where a motion image is picked up, and
the second reading circuit is configured to perform reading by the global shutter mode in a case where a still image is picked up.

27. The solid-state image pickup device according to claim 9, further comprising:
an AD conversion circuit on the second substrate, the AD conversion circuit being configured to convert an analog signal read via the second circuit set into a digital signal.

28. The solid-state image pickup device according to claim 9, wherein an output rate of the signal read by the second reading circuit is higher than an output rate of the signal read by the first reading circuit.

29. A solid-state image pickup device comprising:
first and second substrates on which circuit elements constituting a pixel are arranged, the first and second substrates being electrically coupled to each other;
wherein the first substrate comprises:
a photoelectric conversion element included in the pixel;
an output terminal included in the pixel, the output terminal being coupled to the photoelectric conversion element;
a first output signal line coupled to the output terminal;
a switch coupled to the output terminal and the first output signal line, and
a readout circuit electrically connected to the first output signal line, configured to output a signal corresponding to a charge generated in the photoelectric conversion element outward the solid-state image pickup device, and
the second substrate comprises:
an input terminal coupled to the output terminal;
a capacitor coupled to the input terminal; and
a second output signal line coupled to the capacitor.

30. The solid-state image pickup device according to claim 29, wherein the first output signal line is configured to output, as an output signal on a side of the first substrate, a signal generated by the photoelectric conversion element and output from the output terminal,
the capacitor is configured to store the signal generated by the photoelectric conversion element and supplied via the output terminal and the input terminal, and
the second output signal line is configured to output, an output signal on a side of the second substrate, the signal stored in the capacitor.

31. The solid-state image pickup device according to claim 30, wherein the switch is configured to turn on in a case where the signal generated by the photoelectric conversion element is output from the first substrate, and
the switch is configured to turn off in a case where the signal generated by the photoelectric conversion element is output from the second substrate.

32. An image pickup device comprising:
a plurality of substrates on which circuit elements constituting a pixel are arranged, the plurality of substrates being electrically coupled to one another;
a photoelectric conversion element included in the pixel;
a reading circuit configured to read from the pixel, a signal based on a signal generated by the photoelectric conversion element;

first to n-th circuit sets each comprising a circuit element configured to read a signal by a corresponding one of first to n-th reading modes; and
a control circuit configured to control the circuit elements arranged on one of the plurality of substrates so as to solely complete operations from generation of the signal by the photoelectric conversion element to reading of the signal outward the solid-state image pickup device, in at least one of the first to n-th reading modes, wherein
n is an integer equal to or greater than two, and
the photoelectric conversion element, the reading circuit, and at least one of the first to n-th circuit sets which corresponds to the at least one of the first to n-th reading modes, are arranged on the one of the plurality of substrates.

33. An image pickup device comprising:
first and second substrates on which circuit elements constituting a pixel are arranged, the first and second substrates being electrically coupled to each other;
wherein the first substrate comprises:
a photoelectric conversion element included in the pixel;
an output terminal included in the pixel, the output terminal being coupled to the photoelectric conversion element;
a first output signal line coupled to the output terminal;
a switch coupled to the output terminal and the first output signal line, and a readout circuit electrically connected to the first output signal line, configured to output a signal corresponding to a charge generated in the photoelectric conversion element outward the solid-state image pickup device, and
the second substrate comprises:
an input terminal coupled to the output terminal;
a capacitor coupled to the input terminal; and
a second output signal line coupled to the capacitor.

34. A signal reading method comprising:
reading, by at least one of a first reading mode and a second reading mode, a signal from a pixel of a solid-state image pickup device, the solid-state image pickup device comprising first and second substrates on which circuit elements constituting a pixel are arranged, and the first and second substrates being electrically coupled to each other,
wherein reading the signal by the first reading mode comprises:
generating a signal by a photoelectric conversion element on the first substrate, the photoelectric conversion element being included in the pixel;
outputting the signal generated by the photoelectric conversion element from an output terminal on the first substrate, the output terminal being included in the pixel and coupled to the photoelectric conversion element; and
outputting the signal output from the output terminal to a first output signal line on the first substrate, the first output signal line being coupled to the output terminal outward the solid-state image pickup device, and
reading the signal by the second reading mode comprises:
generating a signal by the photoelectric conversion element;
storing the signal generated by the photoelectric conversion element into a capacitor on the second substrate via the output terminal and an input terminal on the second substrate, the capacitor being coupled to the input terminal, and the input terminal being coupled to the output terminal; and
outputting the signal stored in the capacitor to a second output signal line on the second substrate, the second output signal line being coupled to the capacitor.

* * * * *